(12) United States Patent
Harrop et al.

(10) Patent No.: US 10,830,378 B2
(45) Date of Patent: Nov. 10, 2020

(54) MOUNTING ARRANGEMENT

(71) Applicant: Advanced Insulation Limited, Gloucestershire (GB)

(72) Inventors: Martin Steven Harrop, Gloucestershire (GB); Stewart Ian Morley, Gloucestershire (GB)

(73) Assignee: ADVANCED INSULATION LIMITED (GB)

( * ) Notice: Subject to any disclaimer, the term of this patent is extended or adjusted under 35 U.S.C. 154(b) by 0 days.

(21) Appl. No.: 16/311,211

(22) PCT Filed: Jun. 16, 2017

(86) PCT No.: PCT/GB2017/051771
§ 371 (c)(1),
(2) Date: Dec. 19, 2018

(87) PCT Pub. No.: WO2017/220976
PCT Pub. Date: Dec. 28, 2017

(65) Prior Publication Data
US 2019/0195394 A1    Jun. 27, 2019

(30) Foreign Application Priority Data

Jun. 21, 2016 (GB) .................................. 1610790.6

(51) Int. Cl.
*F16L 3/137* (2006.01)
*F16L 3/237* (2006.01)
(Continued)

(52) U.S. Cl.
CPC ............... *F16L 3/237* (2013.01); *F16L 3/137* (2013.01); *F16L 9/20* (2013.01); *F16L 1/20* (2013.01); *F16L 3/22* (2013.01)

(58) Field of Classification Search
CPC ... F16L 3/327; F16L 3/137; F16L 9/20; F16L 3/08; F16L 2201/00; F16L 3/00; F16L 3/22; F16L 1/20
See application file for complete search history.

(56) References Cited

U.S. PATENT DOCUMENTS 5,395,018 A * 3/1995 Studdiford ............... B62H 5/00
                                                                  224/420
5,941,483 A * 8/1999 Baginski ................... F16L 3/22
                                                                  248/68.1
(Continued)

FOREIGN PATENT DOCUMENTS

GB    2267137 A    11/1993
GB    03074916 A1   9/2003

OTHER PUBLICATIONS

International Search Report and Written Opinion for corresponding international application No. PCT/GB2017/051771, dated Sep. 21, 2017.

*Primary Examiner* — Tan Le
(74) *Attorney, Agent, or Firm* — Tarolli, Sundheim, Covell & Tummino LLP

(57) ABSTRACT

A mounting arrangement for mounting one or more additional elongate members on a larger existing elongate member. The arrangement includes a base member mountable on the outside of the larger pipe and can be held thereon by a strap engaging with ratchet arrangements on the arrangement. A guide member with a generally n shaped configuration which may include an insert member, guides the smaller pipe or pipes.

16 Claims, 39 Drawing Sheets

(51) Int. Cl.
    *F16L 9/19* (2006.01)
    *F16L 1/20* (2006.01)
    *F16L 3/20* (2006.01)
    F16L 3/22 (2006.01)

(56) References Cited

U.S. PATENT DOCUMENTS

| | | | |
|---|---|---|---|
| 6,357,709 B1 * | 3/2002 | Parduhn | F21V 21/116 |
| | | | 248/214 |
| 6,378,813 B1 | 4/2002 | Gretz | |
| 8,998,150 B2 * | 4/2015 | McMiles | F16L 3/08 |
| | | | 248/316.1 |
| 9,200,654 B1 * | 12/2015 | Parduhn | F16B 7/0493 |
| 9,534,706 B2 * | 1/2017 | Larsson | F16L 3/08 |
| 2008/0283687 A1 * | 11/2008 | McClure | E21B 17/1035 |
| | | | 248/74.1 |

\* cited by examiner

MOUNTING ARRANGEMENT

RELATED APPLICATIONS

The present invention is a U.S. National Stage under 35 USC 371 patent application, claiming priority to Serial No. PCT/GB2017/051771, filed on 16 Jun. 2017; which claims priority of GB 1610790.6, filed on 21 Jun. 2016, the entirety of both of which are incorporated herein by reference.

This invention concerns a mounting arrangement for mounting an additional elongate member to an existing elongate member.

In a number of applications such as oil and gas production or offshore windfarms, it is required, or at least desirable, to mount an additional elongate member or members to an existing elongate member, generally with the additional elongate member or members being significantly smaller than the existing elongate member. This could for instance mean mounting a cable or cables, or one or more relatively small pipes, to a pipe or cylindrical support or similar.

A number of prior proposals are available for such applications. These however often have a number of potential drawbacks. For instance, the systems may be relatively expensive, inflexible and/or require specific components for different elongate members and/or situations. Also such systems may not readily permit further additional elongate members to subsequently be mounted on an existing elongate member.

According to an aspect of the invention there is provided a mounting arrangement including a base member which is mountable on the outside of an existing elongate member and a guide member for supporting an additional elongate member extending parallel to the existing elongate member, the guide member being mountable on the base member to extend radially therefrom.

The base member may include one or more securing formations to secure a line means to the base member, which line means can extend around an existing elongate member.

The base member may be made of two parts, which parts may be identical. Respective interengaging male and female formations may be provided on the parts, to mount the parts together.

A resilient member or members may be provided on an underside of the base member to engage against the surface of an existing elongate member. The resilient member or members may be made of rubber or a plastics material, which may be polypropylene. Surface formations may be provided on the underside of the base member engageable against the surface of an existing elongate member.

Securing formations may be provided towards each circumferential end of the base member.

The securing formations may each include a securing member extending tranversely across the base member.

The securing formations may each include a ratcheting configuration.

Each ratcheting configuration may be profiled to permit a correspondingly profiled securing member to be rotatingly movable relative to the base member in one direction, but to be restrained from rotation in an opposite direction by the interaction of the profiling of the ratcheting formation and the securing member.

The securing members may have an external formation engageable with the ratcheting formation such that the securing member can only be rotated in one direction relative to the base member, and is restrained from rotation in an opposite direction by the profiling of the engagement and ratcheting formations.

The securing member external formation may comprise a radially extending projection or projections, and the or each projection may be provided just towards one end of the securing member.

In one format each ratcheting configuration is provided on a non circular washer mountable on the remainder of the base member.

In a further format each ratcheting configuration is integral with the remainder of the base member.

In a still further format the ratcheting configuration may include a sprung arrangement resiliently engageable against the profiled securing member, with the profiling of the securing member being such that the profiled securing member can be rotatingly moved in one direction against the engagement of the sprung arrangement, but is restrained from rotation in an opposite direction by the interaction of the profiling of the sprung arrangement and/or the securing member.

In one arrangement the sprung arrangement may include a sprung finger which is resiliently urged against the profiled securing member. The sprung finger may have a profiled engagement part engageable with the profiled securing member, to only permit relative rotational movement therebetween in one direction.

In a further arrangement the sprung arrangement includes one or more engagement members engageable against the profiled securing member, with a resilient arrangement urging the one or more engagement members against the profiled securing member. The resilient arrangement may include a trapped resilient member engageable with the engagement member to urge the engagement member against the profiled securing member.

The securing member may be in the form of a pin, which pin may have a head, and the external formation may be provided at one end of the pin on or adjacent the head.

A formation may be provided on the or each securing member to permit the end of a line means to be mounted thereto. This formation may be a slot.

A shoulder may be provided at one or both ends of the securing members to retain the securing members in a required position relative to the base members.

A formation may be provided in one or both ends of the securing members to permit a tool to engage therewith to rotate the securing member.

The securing members may be made of metal, and may be made of aluminium or steel. Alternatively the securing members may be made of a plastics material, and may be made of a polymer which may be glass filled, and the polymer may be polyamide.

The base member may include a central portion with a substantially arcuate underside, and outer portions which are of greater diameter than the central portion, with recesses on the underside of the base member between the central portion and respective outer portions such that the base member can flex about the recesses. A number of openings may be provided in the base member.

The guide member may include an enclosure member which is mountable to the base member to enclose an area through which an additional elongate member or members may supportingly extend.

The guide member may be mountable to the base member at a plurality of different positions to respectively enclose different sizes of areas, such that different sizes and/or numbers of additional elongate members can supportingly extend therethrough.

The guide member may be substantially n-shaped, with the limbs of the n mountable to the base member. A mounting formation which may be a through hole, may be provided on each limb of the n.

A plurality of mounting formations may be provided on each limb of the n to permit the guide member to be mounted at a plurality of different positions.

A pair of spaced aligned mounting holes may be provided on the base member, which are alignable respectively with a one of a plurality of through holes in the guide member with an elongate mounting member extendable therethrough, to mount the guide members on the base member.

The elongate mounting member may have a tapering distal end diverging from a smaller distal end point. The elongate mounting member may have an enlarged head at a proximal end.

The guide member may also include an insert member locatable within the area enclosed by the enclosure member, with one or more openings provided through the insert member to permit an additional elongate member to supportingly extend therethrough.

The insert member may be made of two parts, which parts may be identical. The, some, or all of the openings in the insert member may be defined by both parts of the insert member.

In one arrangement the insert member is made of a resilient material, and has a gap extending to an edge thereof, such that opposite sides of the gap can be pushed together to locate the insert member in the guide member, and release of the gap will cause the insert member to relax and be held resiliently in the guide member.

The insert member may be made of a plastics material, and may be made of elastomeric polyurethane.

The guide member may be made of a plastics material and may be made of polypropylene.

The arrangement may include line means extendable around an existing elongate member, which line means may be in the form of a strap, which strap may be made of a plastics material such as Kevlar or fibre reinforced polymer, or metal such as titanium or inconel.

A link member may be provided for mounting together two base members in a circumferential alignment on an existing elongate member.

The link member may be engageable with respective securing members on adjacent base members.

The link member may include formations through which the respective securing members extend, and the formations may include through passages.

The link member may include a profiled face engageable against an existing elongate member, when mounting together two base members on an existing elongate member.

The mounting arrangement may include a plurality of base members with respective guide members, and a respective link member or members for mounting together the base members.

Embodiments of the present invention will now be described by way of example only and in relation to the accompanying drawings, in which:—

The drawings show a first modular mounting arrangement 10 for mounting one or more additional elongate members such as pipes 12 on a larger existing elongate member such as a larger pipe 14. Such arrangements 10 could be used for existence in offshore oil or gas production or on wind farms.

Whilst one such arrangement 10 is described, it is to be realised that a plurality of such arrangements 10 would be provided spaced along the pipes 12, 14 or other elongate members.

Figure 1:
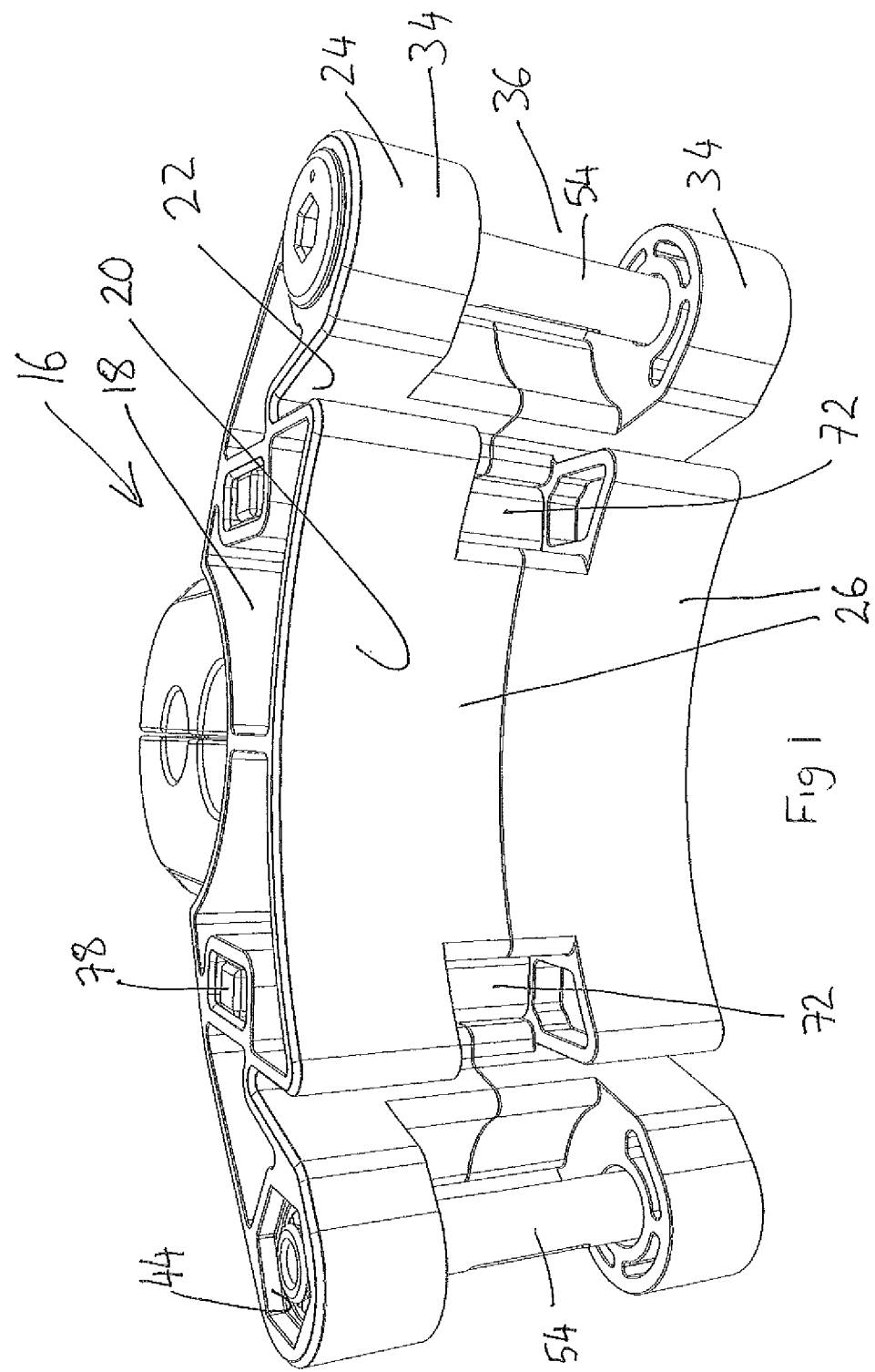
FIG. 1 is a diagrammatic perspective view from beneath of a first base member and corresponding pins according to the invention.
Figure 2:
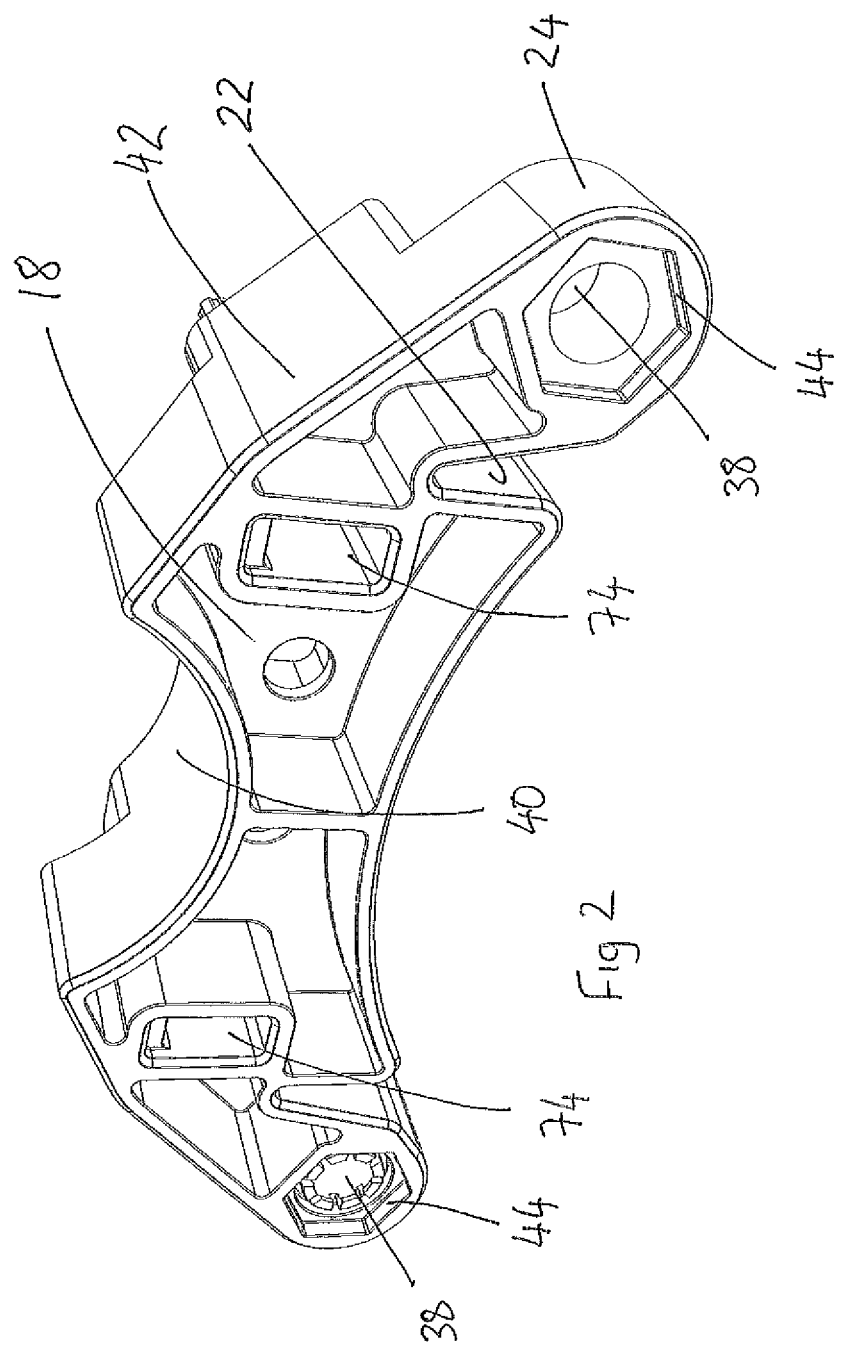
FIG. 2 is a diagrammatic perspective view from one side of a part of the base member of FIG. 1.
Figure 3:
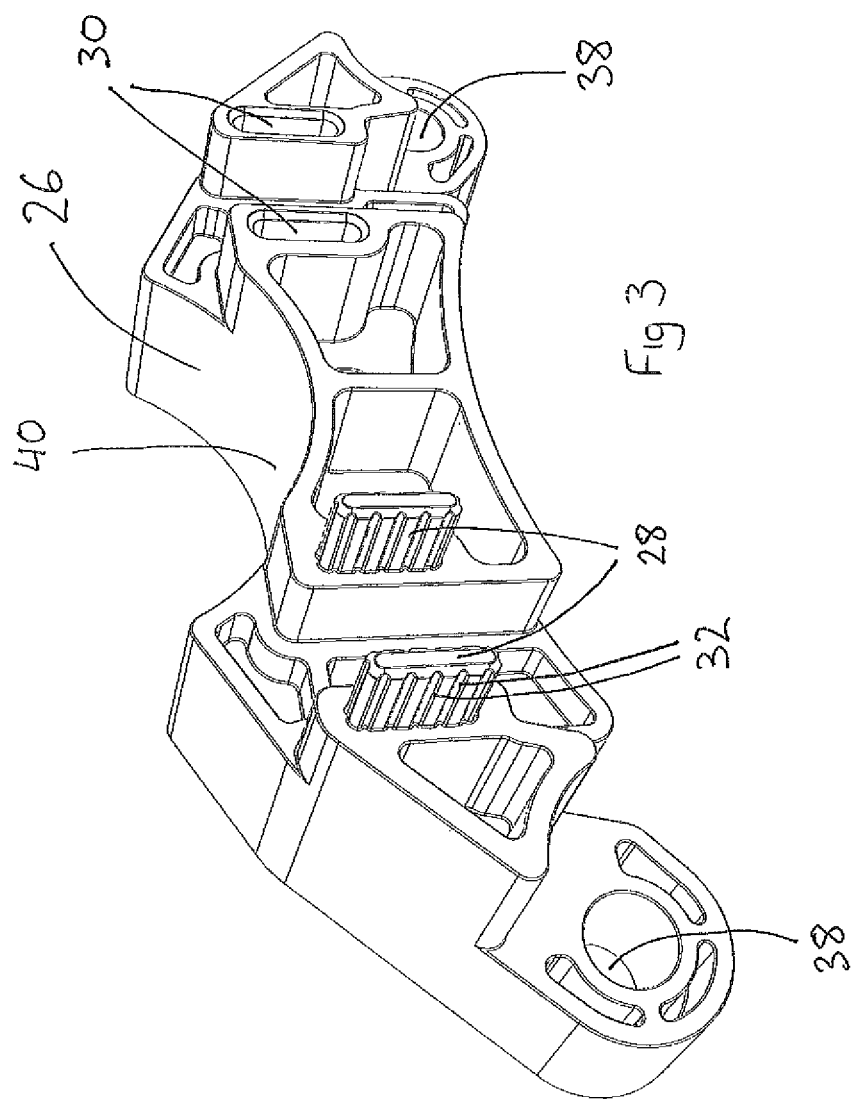
FIG. 3 is a similar perspective view to FIG. 2 but from the opposie side.
Figure 4:
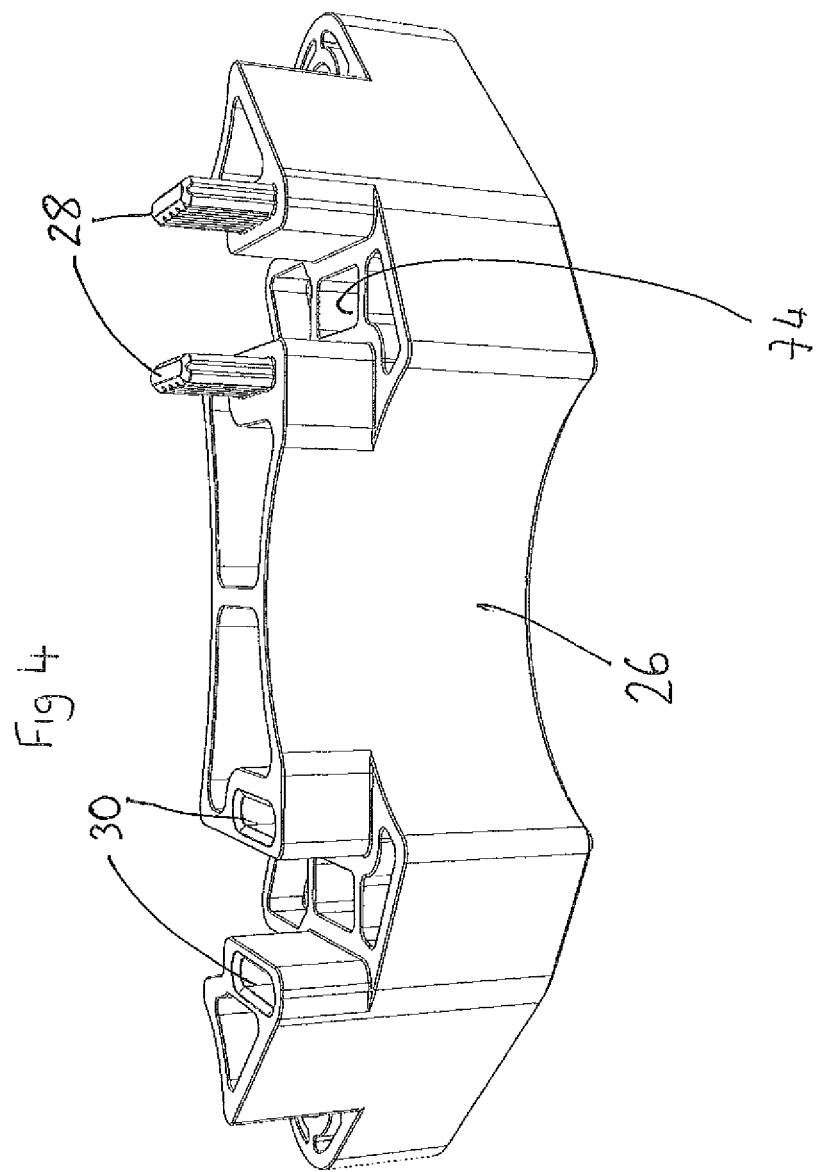
FIG. 4 is a further perspective view from the same side as FIG. 3.
Figure 5:
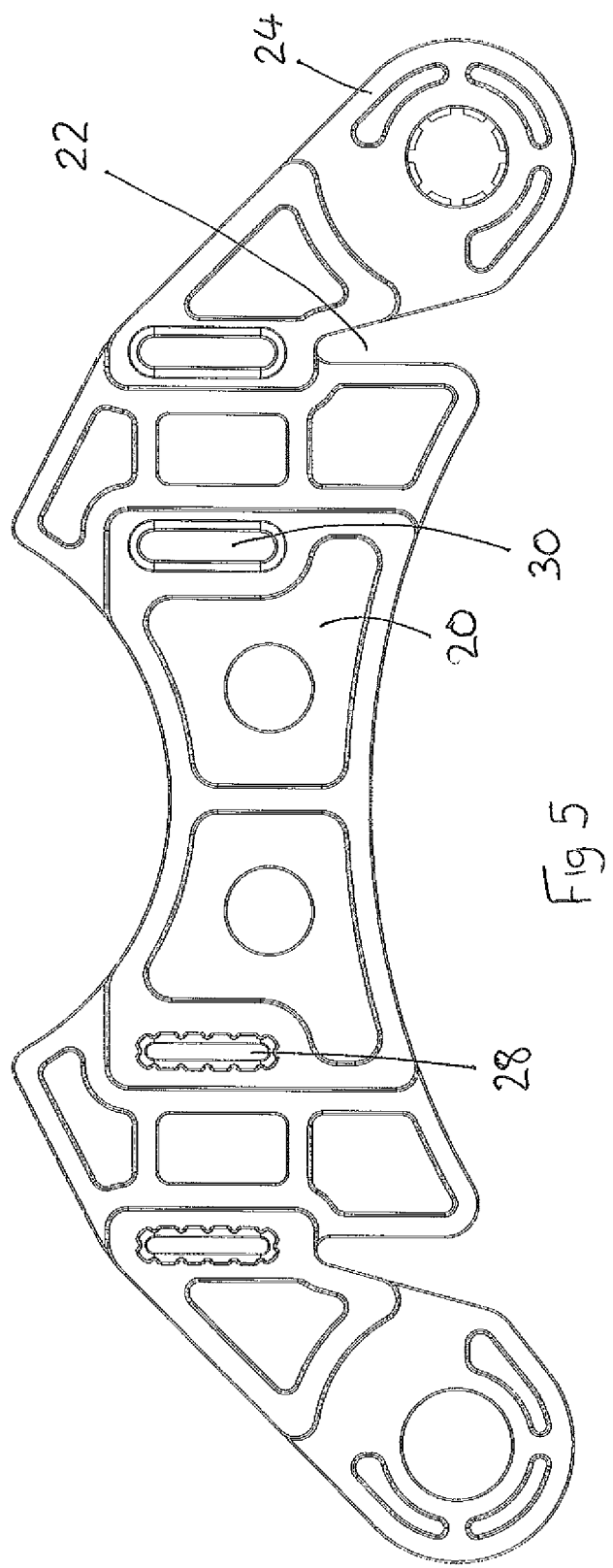
FIG. 5 is a cross sectional side view of the part as shown in FIG. 3.
Figure 6:
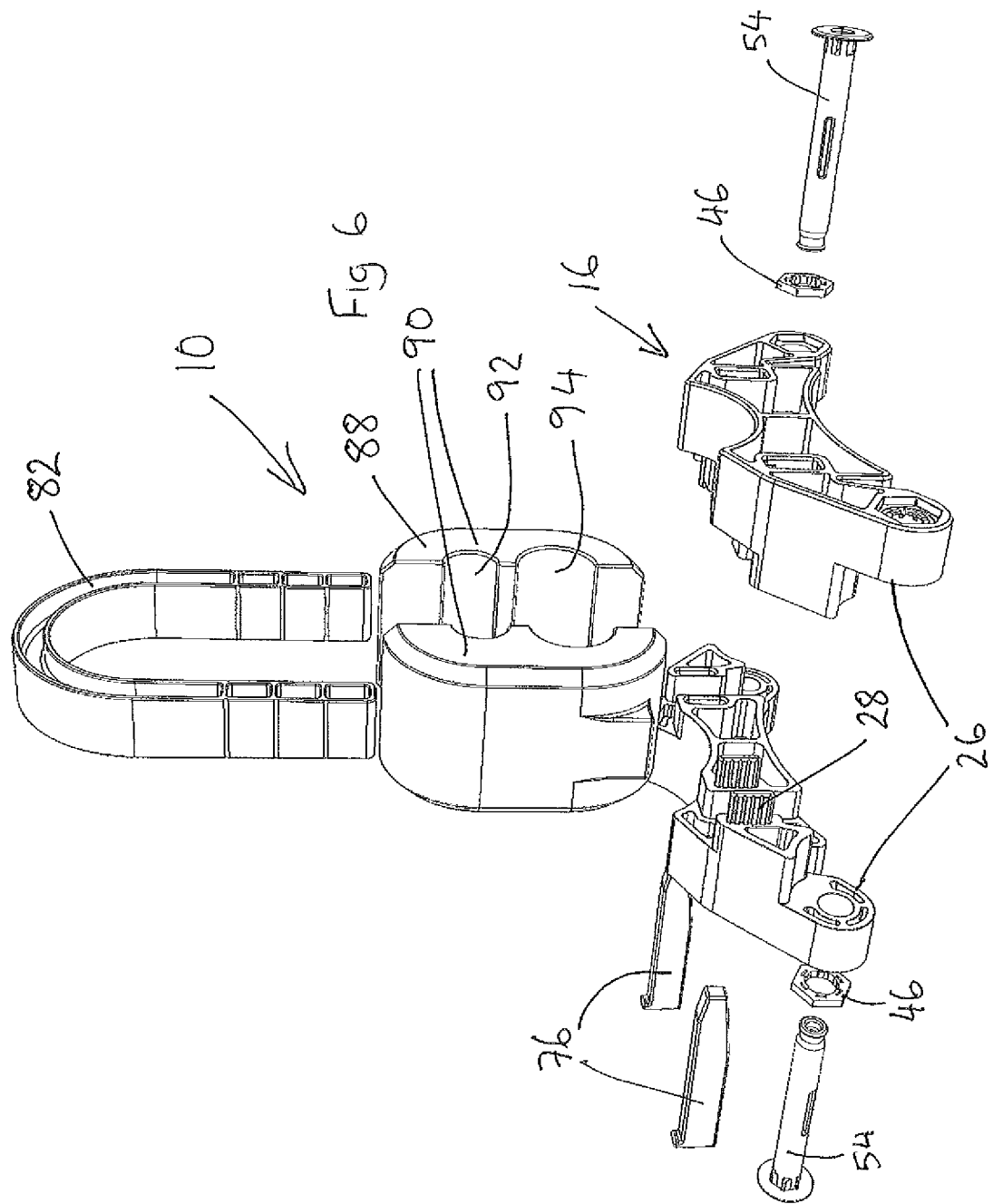
FIG. 6 is a diagrammatic perspective exploded view of a first mounting arrangement including the first base member of FIG. 1.
Figure 7:
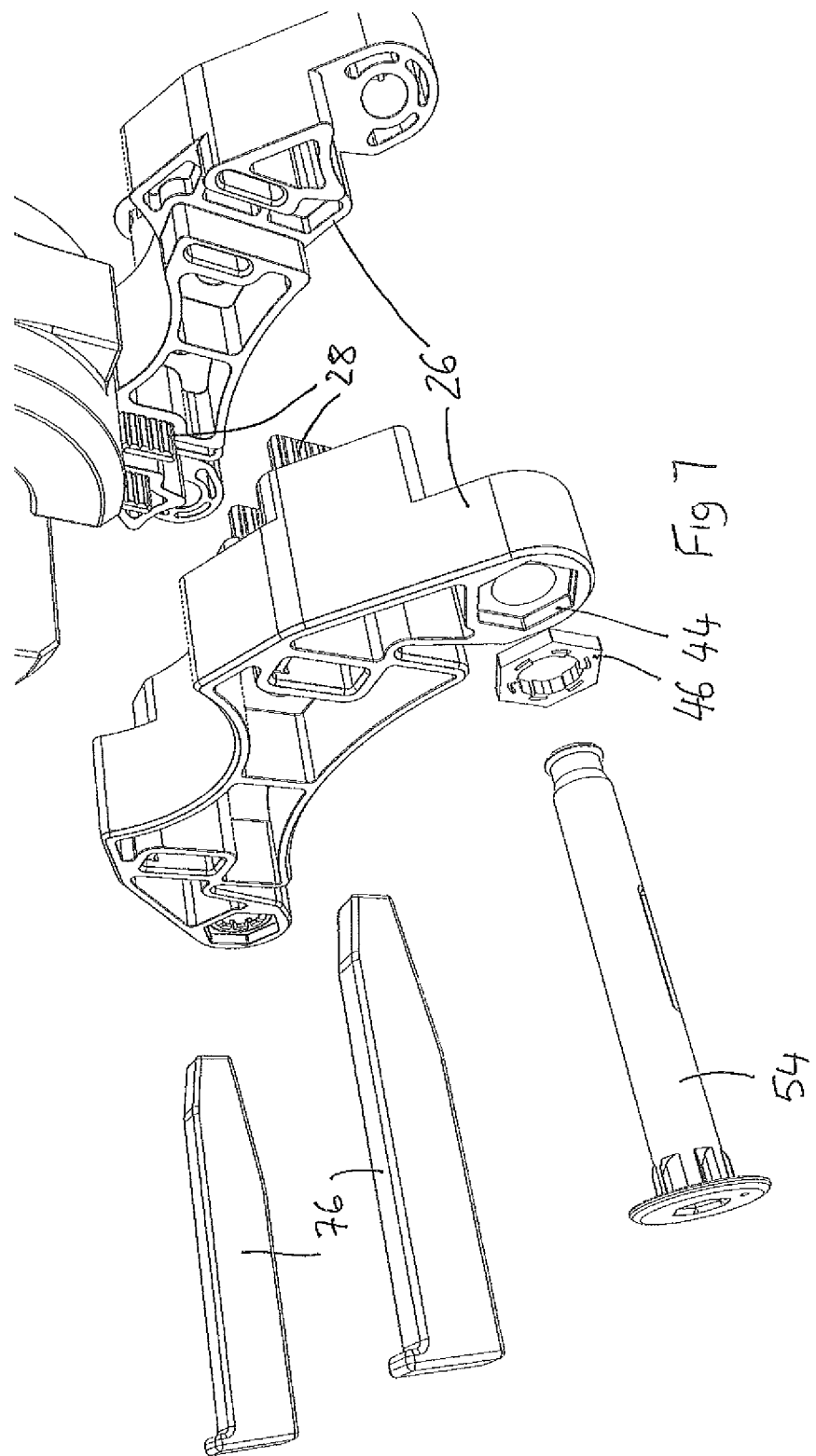
FIG. 7 is a diagrammatic exploded perspective view of part of the arrangement of FIG. 6.
Figure 8:
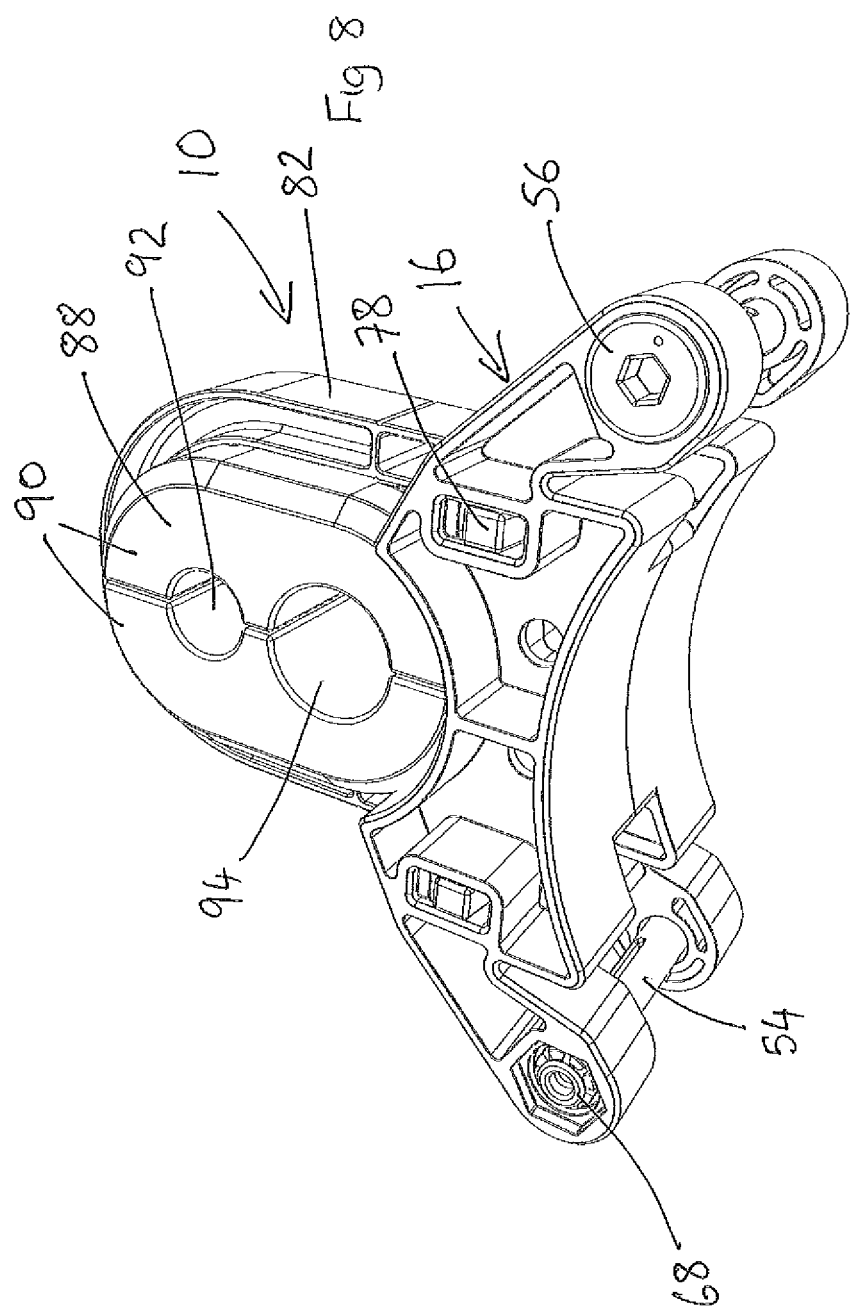
FIG. 8 is a perspective first side view of the arrangement of FIG. 6.
Figure 9:
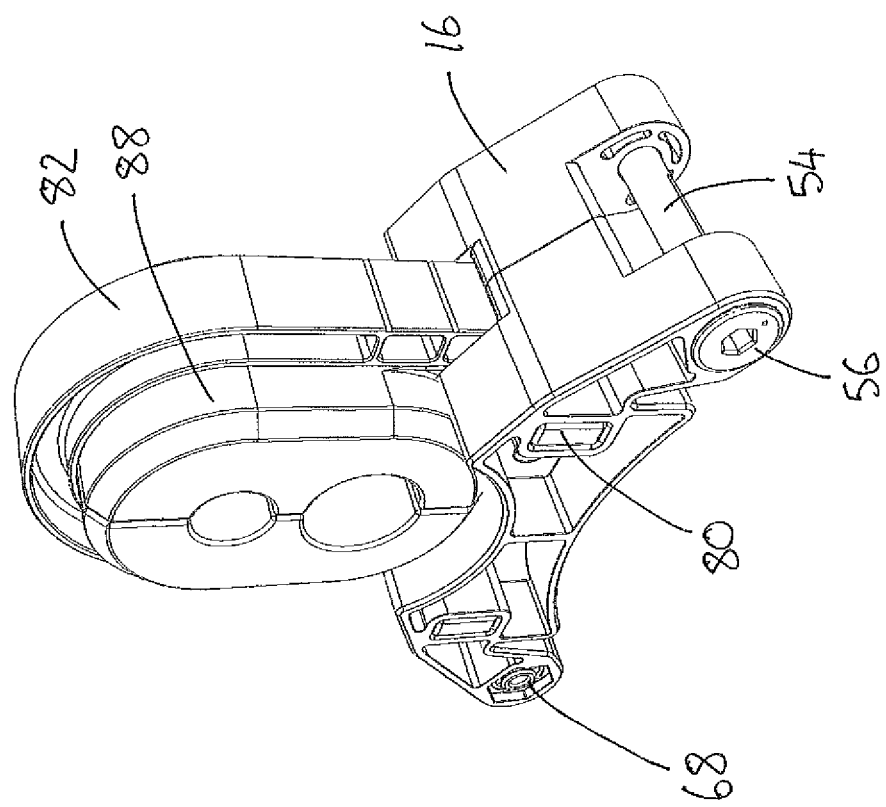
FIG. 9 is a perspective second side view of the arrangement of FIG. 6.
Figure 10:
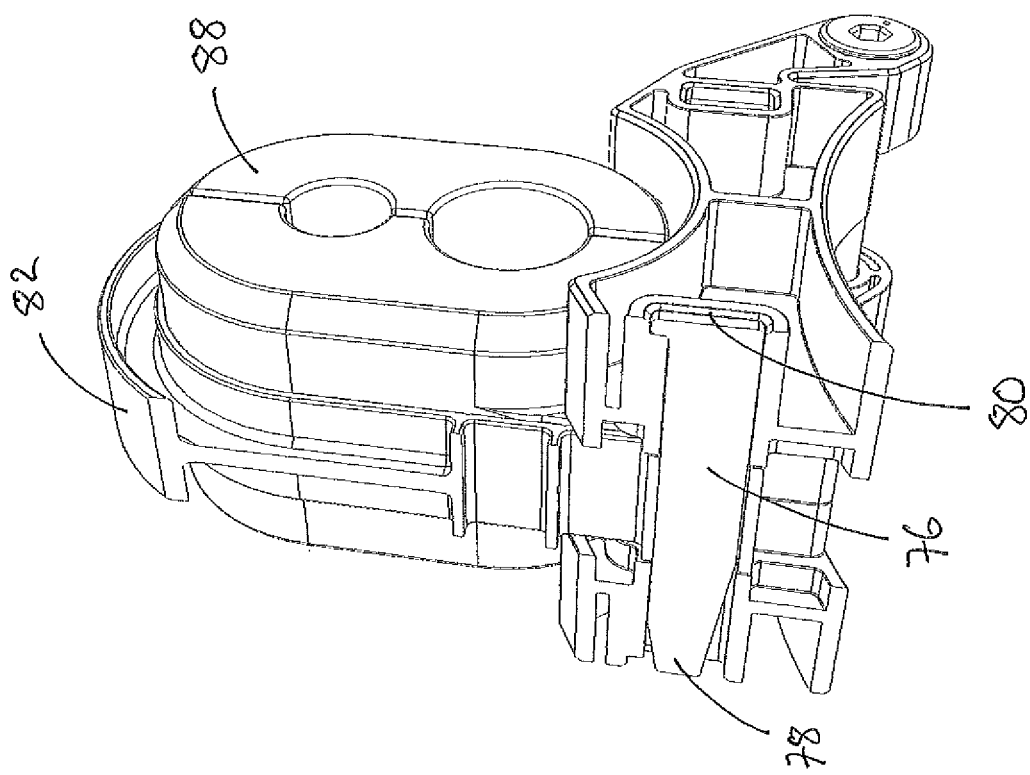
FIGS. 10 and 11 are sectional views through parts shown in FIGS. 8 and 9.
Figure 11:
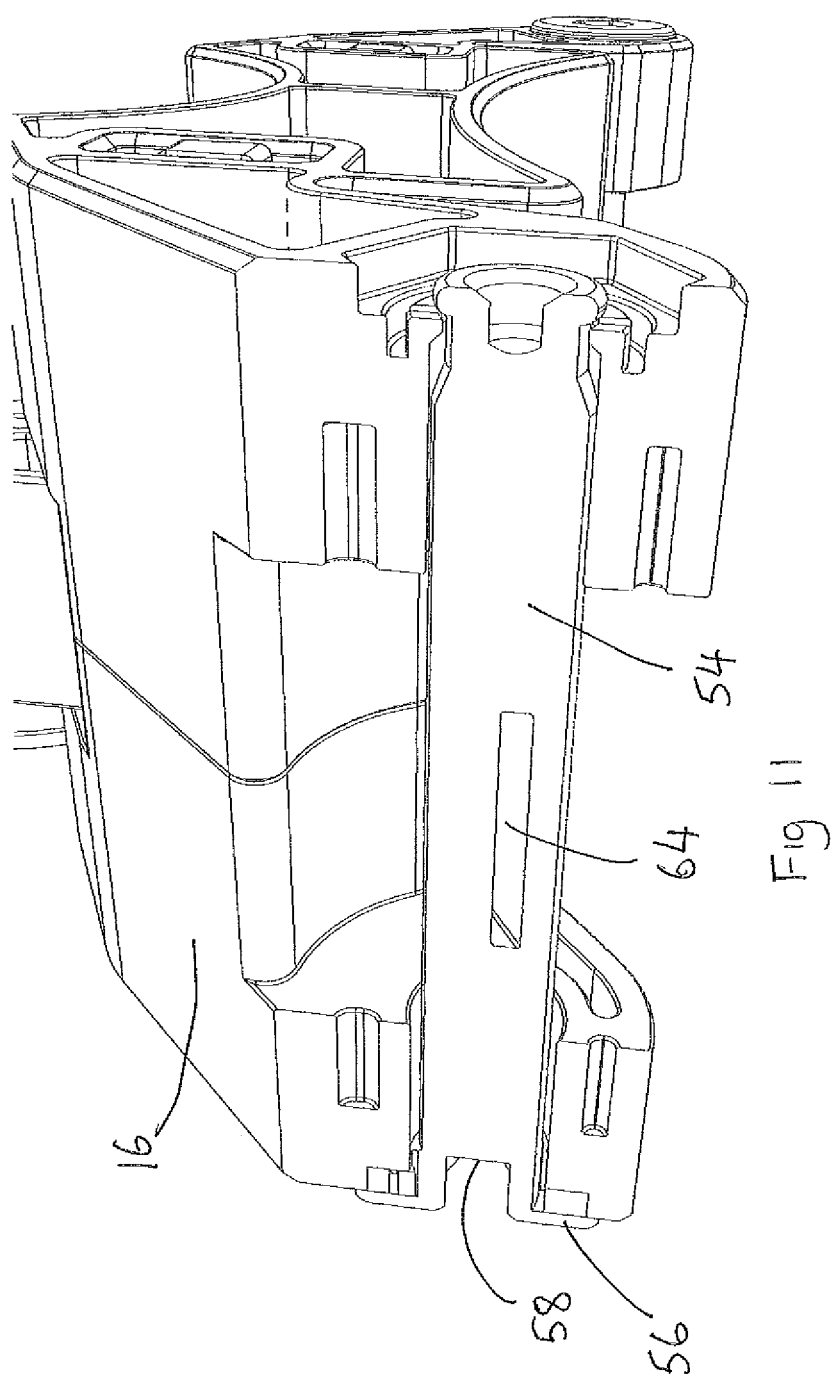
Figure 12:
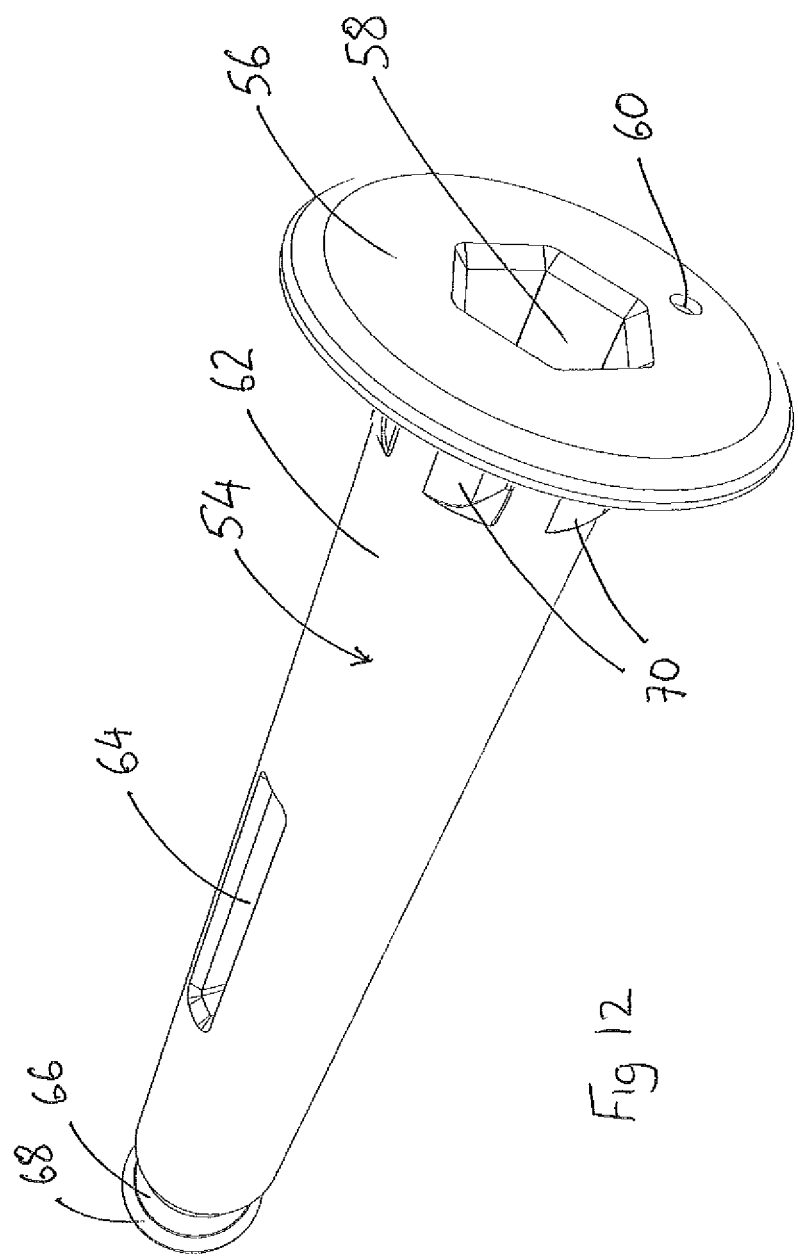
FIG. 12 is a diagrammatic perspective view from one end of a pin of the invention.
Figure 13:
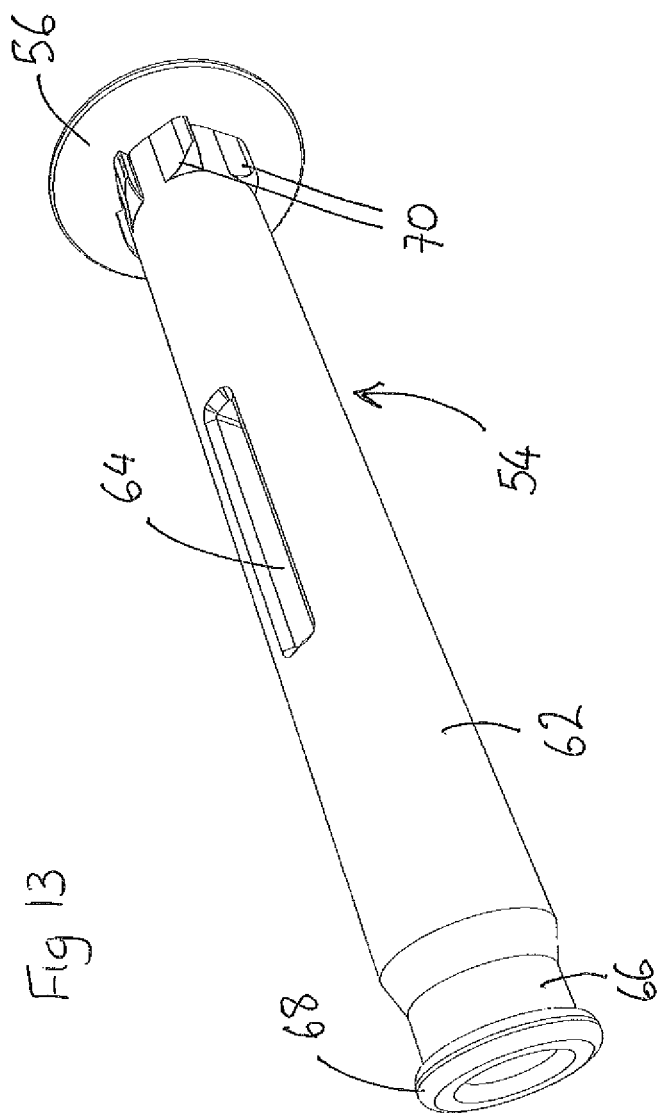
FIG. 13 is a diagrammatic perspective view of the pin of FIG. 12 from an other end.
Figure 14:
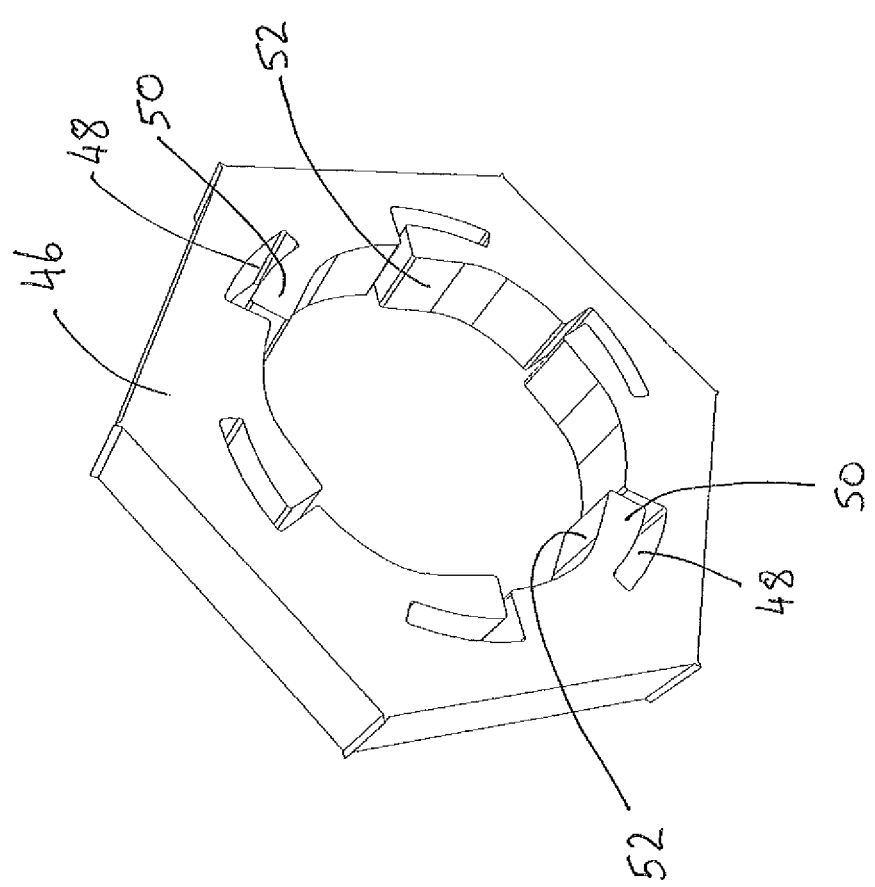
FIG. 14 is a diagrammatic perspective view of a ratcheting washer of the arrangement of FIG. 6.
Figure 15:
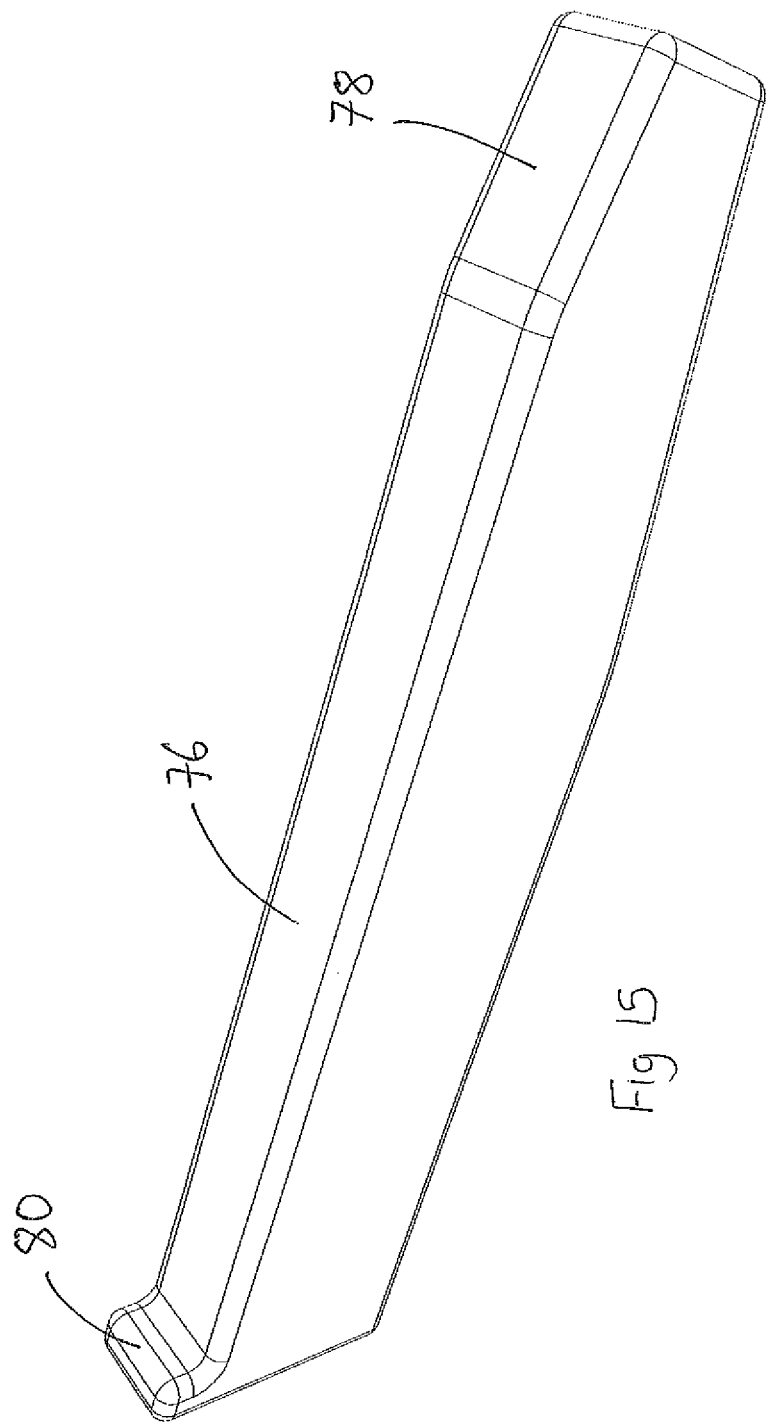
FIG. 15 is a diagrammatic side view of an elongate mounting member of the arrangement of FIG. 6.
Figure 16:
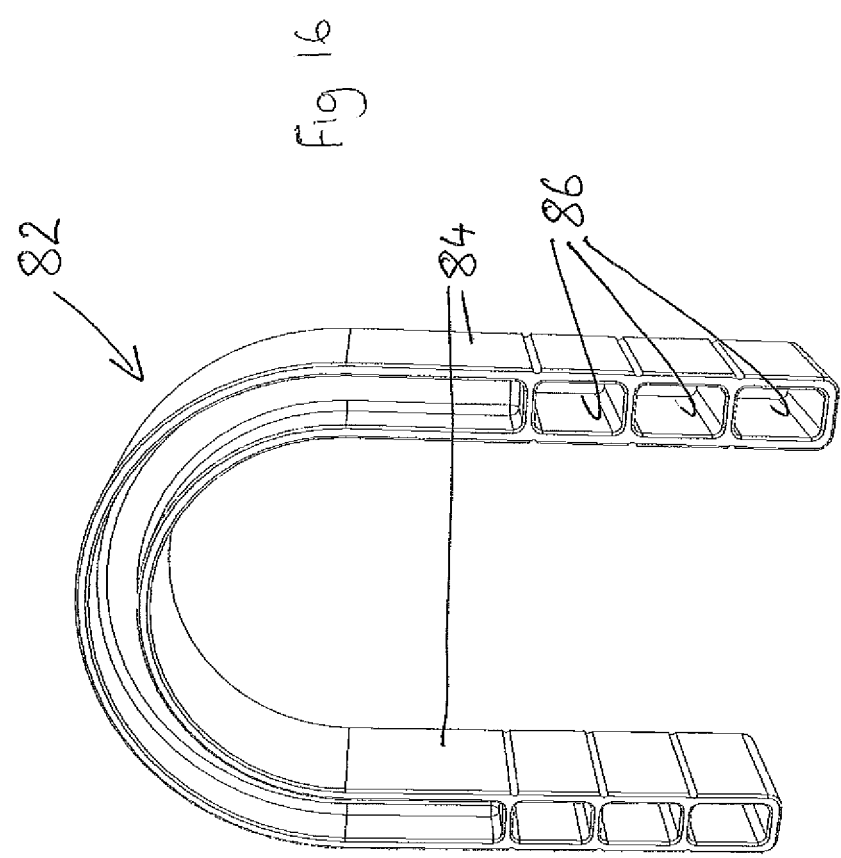
FIG. 16 is a diagrammatic perspective side view of a guide member of the arrangement of FIG. 6.

FIG. 1 and other views shows a first base member 16 which would be made of a plastics material such as for instance polypropylene. In end view the base member 16 has a central portion 18 with an arcuate underside 20.

Viewed in end section, lower recesses 22 are provided either side of the central portion 18 extending for substantially half the height of the base member 16 and converging upwardly. Outer portions 24 are provided on each side of the recesses 22, and as can be seen the underside of the outer portions 24 has a greater diameter than that of the central portion 18.

The base member 16 is formed from two identical parts 26 which can be mounted together by a pair of projections 28 towards one side of each part 26 engageable in an interference fit in corresponding openings 30 on the other side of the respective part 26. Ribs 32 are provided on the projections 28 to help provide the interference fit.

When joined together the two parts 26 provide circumferential projections 34 at each end defining a space 36 in between. Aligned openings 38 are provided through each of the projections 34. An arcuate recess 40 is provided in just a central part of the upper face 42 of the base member 16.

The parts 26 of the base member 16 have a skeletal structure with openings therethrough to provide sufficient strength whilst minimising the amount of material used and hence minimising cost and weight. A hexagonal recess 44 is provided around each of the aligned openings 38 on the outer side thereof.

A profiled ratchet formation in the form of a hexagonal washer 46 is provided on just one of the outer aligned openings 38 on each part 26, such that two hexagonal washers 46 are provided in diagonally opposite locations on the base member 16. The hexagonal washers 46 locate within the respective hexagonal recess 44 in an interference fit. The ratchet formation provided by the washers 46 comprises a plurality of circumferentially outwardly extending L-shaped recesses 48 defining a section 50 of material providing a cam surface 52, which section 50 of material can be flexed outwardly.

A respective pin 54 is provided extending between each pair of aligned openings 38, but with the two pins 54 facing in opposite directions to each other. Each of the pins 54 has an enlarged head 56 with an axial hexagonal recess 58 to receive an appropriate tool such as an Allen key to facilitate rotation of the pin 54. A small indent 60 is provided in the head 56 as a marker of the orientation of the pin 54. Each pin 54 has a main body 62 extending from the enlarged head 56, with a through longitudinal slot 64 substantially centrally thereof. The indent 60 corresponds to the diametrical position of the respective slot 64 to provide a visual indication of the slot alignment.

The main body 62 tapers inwardly at the opposite end to the head 56 to a shorter reduced diameter section 66, with an enlarged distal end 68, which end 68 is a slightly larger diameter than the main body 62.

Four equispaced radial projections 70 are provided on the main body 62 adjacent the enlarged head 56. The projections 70 are of a size to engage with the ratchet formation provided by the washer 46 such that the pins 54 when fully inserted into the respective aligned openings 38 can be rotated clockwise, and the projections 70 will engage against the cam surfaces 52 urging the sections 50 of material outwardly. Once the end of a respective section 50 of material has been reached, then that section 50 will spring inwardly again, and will prevent the pin 54 from being rotated anticlockwise, by virtue of the section 50 engaging against the respective projection 70.

The enlarged end 68 once the pin 54 is fully pushed through a pair of aligned openings 38, prevents the pin 54 from coming out without a sufficient axial force to deform the part 26 to enable the enlarged distal end 68 to pass through the respective aligned openings 38.

The parts 26 are profiled so as when interconnected they define a pair of substantially radial slots 72 through the base member 16. Two pairs of aligned through passages 74 are provided in the base member 16, with a pair of through passages 74 on each part 26. The through passages 74 extend into the radial slot 72, spaced from the underside of the base member 16.

A pair of elongate mounting members 76 are slidably locatable in an interference fit between a pair of the aligned through passages 74 across the respective radial slot 72. The elongate mounting members 76 have a tapering distal end 78 diverging to a substantially constant cross section for the remainder of the mounting members 76 and an enlarged head 80.

A guide member 82 is provided which has a generally n shape configuration with two side limbs 84 each with three openings 86 one above each other each opening 86 being, of a size to slidingly receive a one of the elongate mounting members 76. The guide member 82 is proportioned such that the guide member 82 can be mounted on the base member 16 with the side limbs 84 slidingly extending through the respective passages 74. The elongate mounting members 76 can extend through a respective pair of the openings 86 to retain the guide member 82 in a required position on the base member 16.

An insert member 88 may be provided which can locate within the space defined between the guide member 82 and base member 16 when mounted thereon. As shown in a number of the drawings, the insert member 88 may comprise two identical parts 90 which each define half of a pair of respective openings 92, 94, such that when the two parts 90 are joined together the two openings 92, 94 are defined as shown the outer opening 92 in use is of smaller diameter than the inner opening 94. It is to be realised that a wide range of different insert members can be used as required to carry a required number of pipes, and also pipes of different diameters As shown in FIGS. 17 to 22, the arrangement 10 can be mounted on existing elongate members such as the pipe 14 by a band 96 extending around the pipe 14 and being connected to the respective pins 54. The band 96 could be made of a plastics material such as Kevlar or fibre reinforced polymer, or could be made of a corrosion resistant metal such as titanium or inconel.

The band 96 is looped around the pipe 14 and ends of the band 96 are respectively each passed through a respective slot 64 in a one of the pins 54. The pins 54 are then rotated against the ratchet arrangement until the band 96 is tightened, following which the base member 16 is firmly mounted on the pipe 14.

The guide member 82 can then be mounted on the base member 16 at a required height by locating the guide member 82 at a required position and passing the elongate mounting members 76 through the aligned passages 74 and respective openings 86. The tapering distal ends 78 mean that as the mounting members 76 are pushed in this will urge the guide member 82 radially inwardly providing for a tightening action. The mounting member 76 can be pushed in until the head 80 engages against the base member 16.

The underside of the insert member 88 is arcuate to locate in the arcuate recess 40 of the base member 16 to help to accurately align the insert member 88 with the base member 16.

Figure 17:
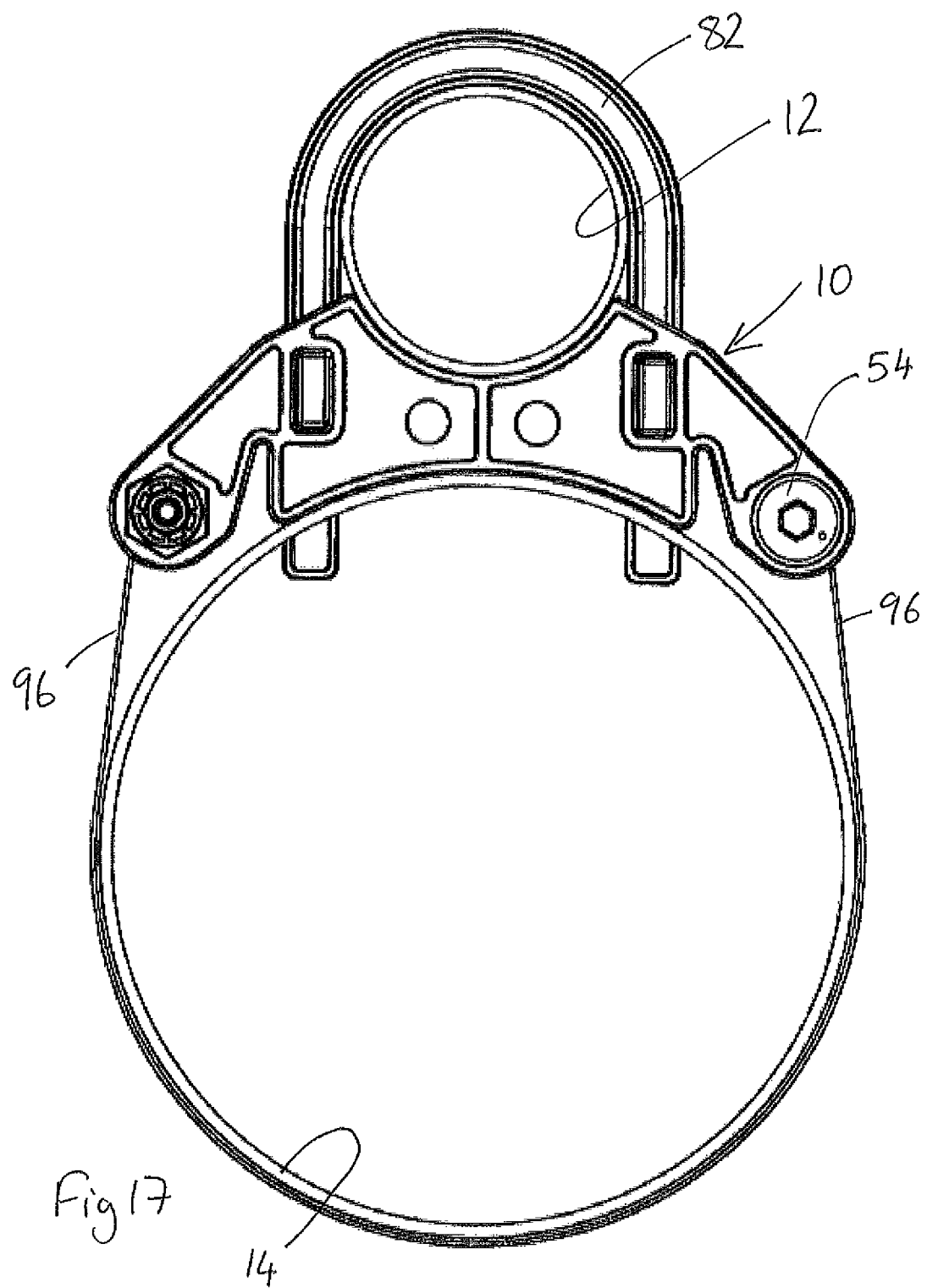
FIGS. 17, 18 and 19 are respectively diagrammatic end, side and perspective views of the arrangement of FIG. 6 in use in a first condition.
Figure 18:
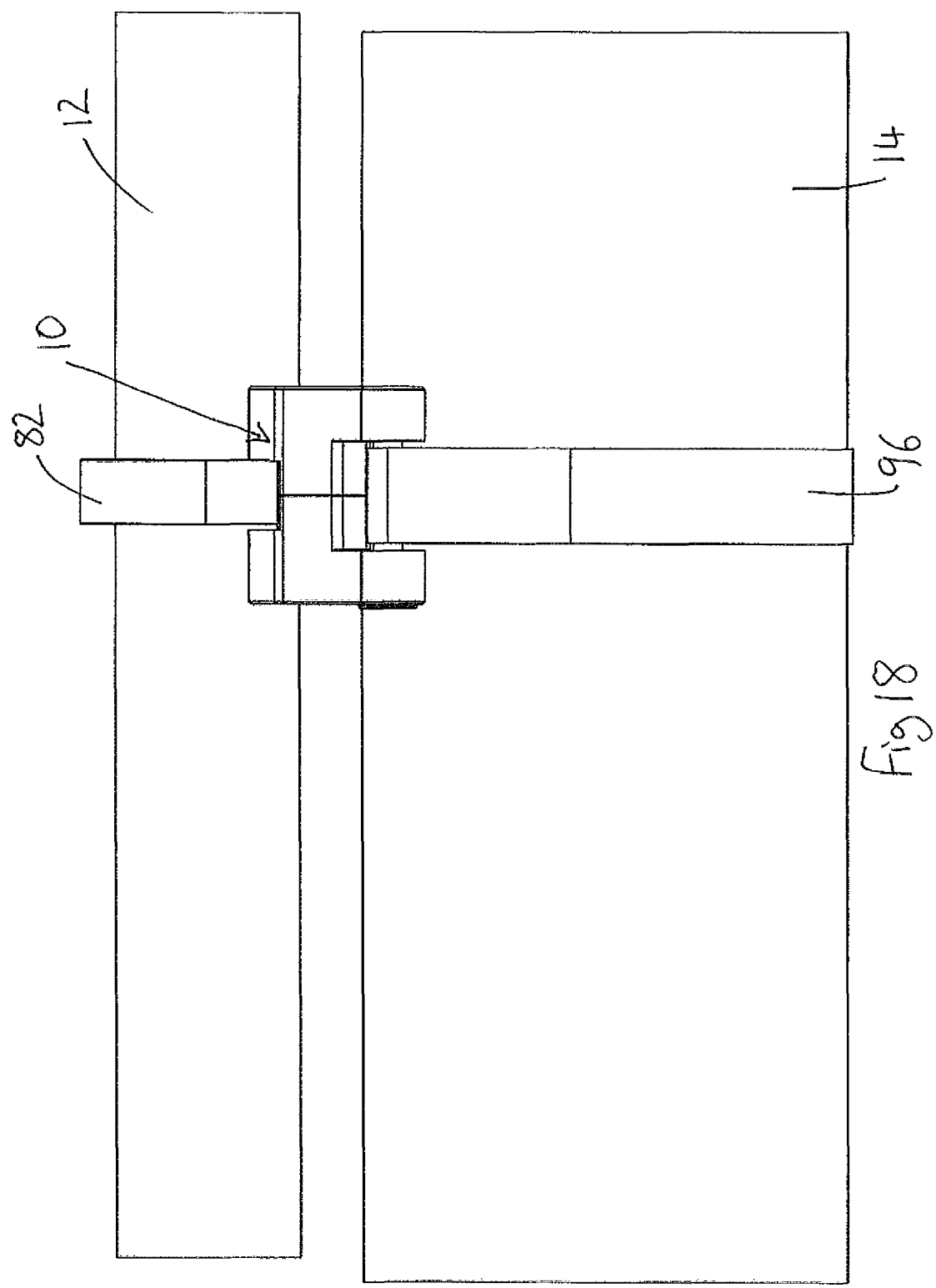
Figure 19:
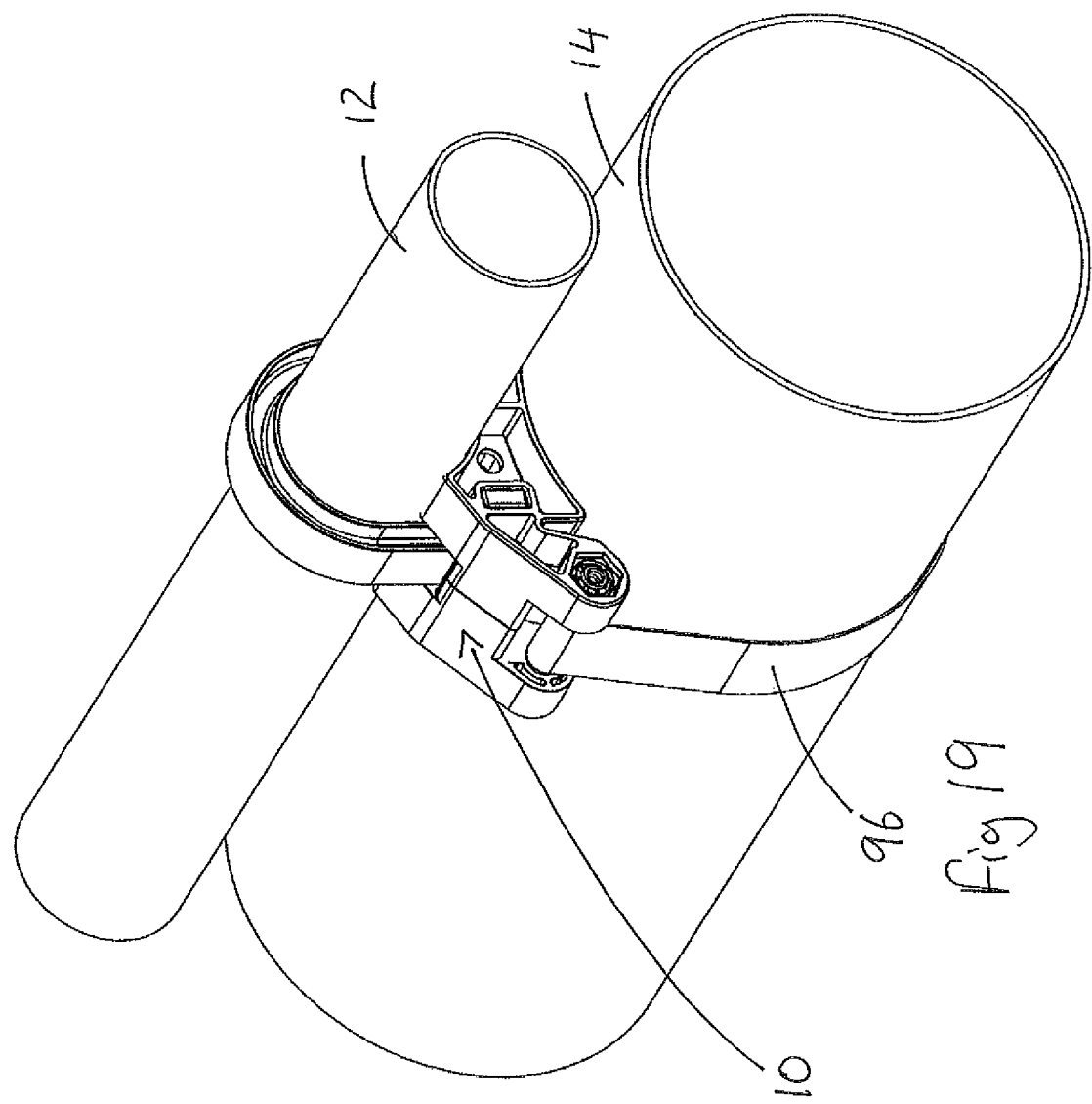

FIGS. 17 to 19 show a first configuration where the space defined between the guide member 82 and the base member 16 is of a size to slidingly receive a pipe 12 as shown. In FIG. 17 the lower ends of the guide member 82 are shown protruding into the larger pipe 14. These lower ends will in fact in practice have been removed.

Figure 20:
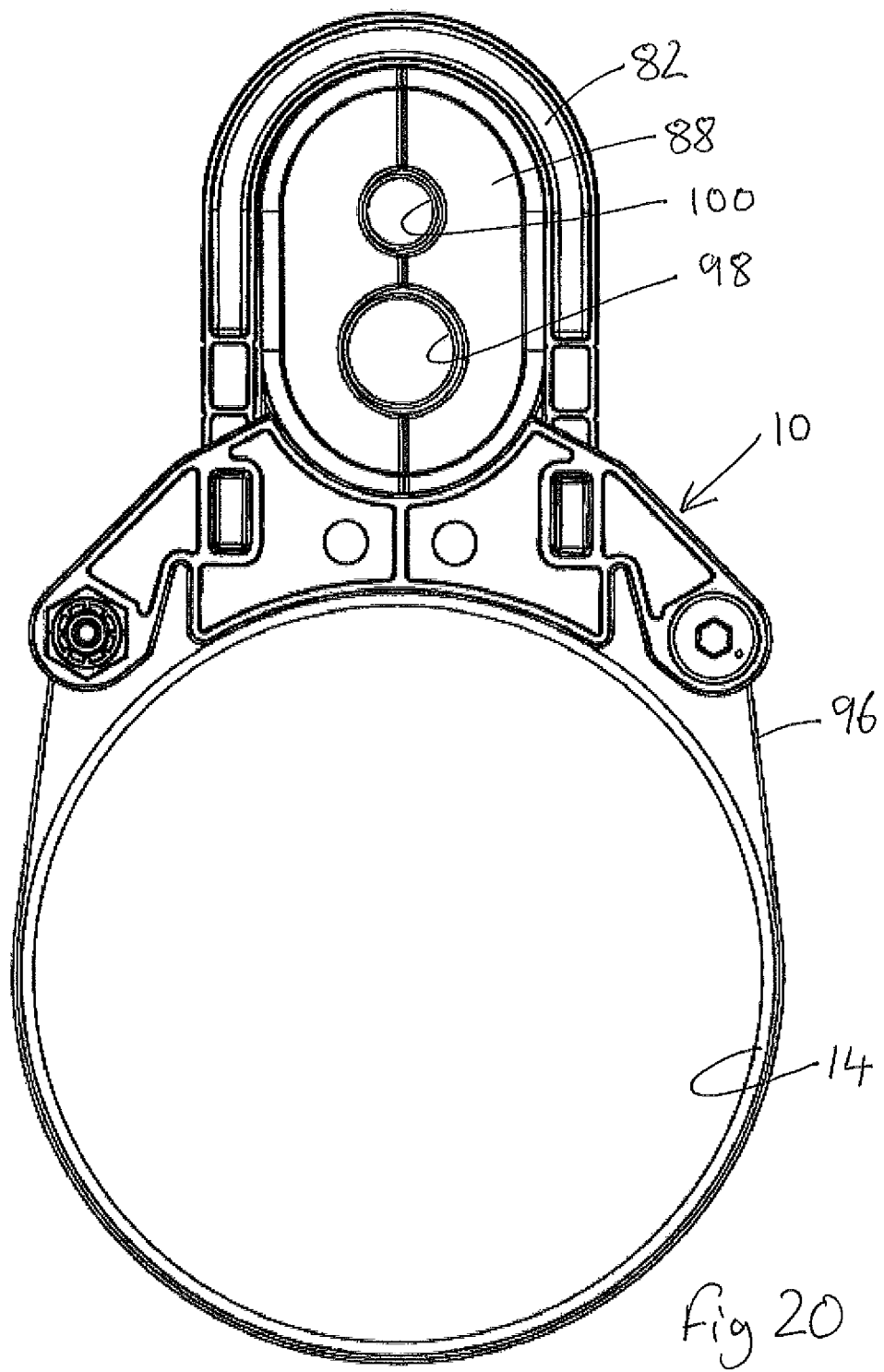
FIGS. 20, 21 and 22 are similar views respectively to FIGS. 17 to 19 of the arrangement of FIG. 6 but in use in a second condition.
Figure 21:
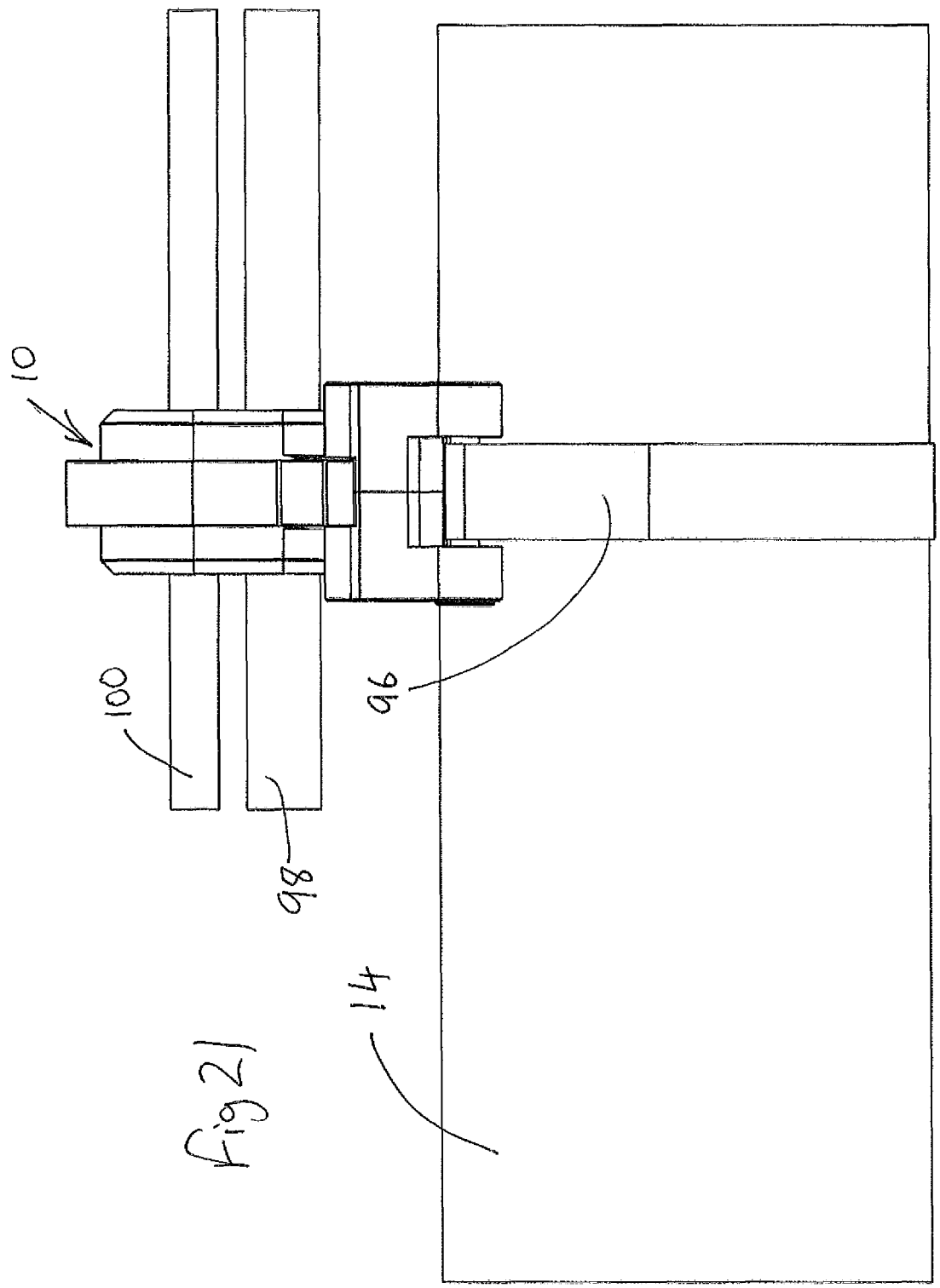
Figure 22:
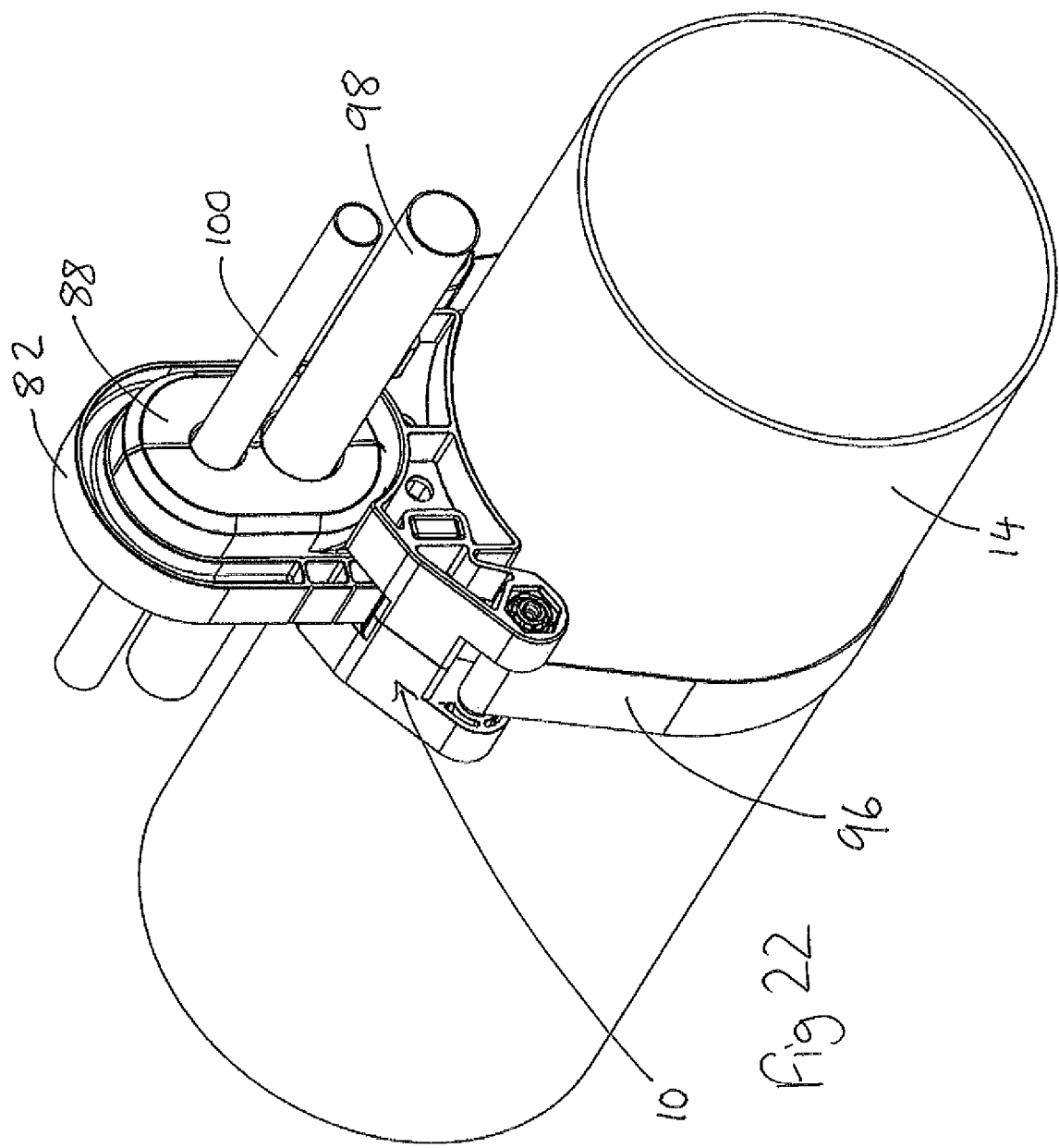
Figure 23:
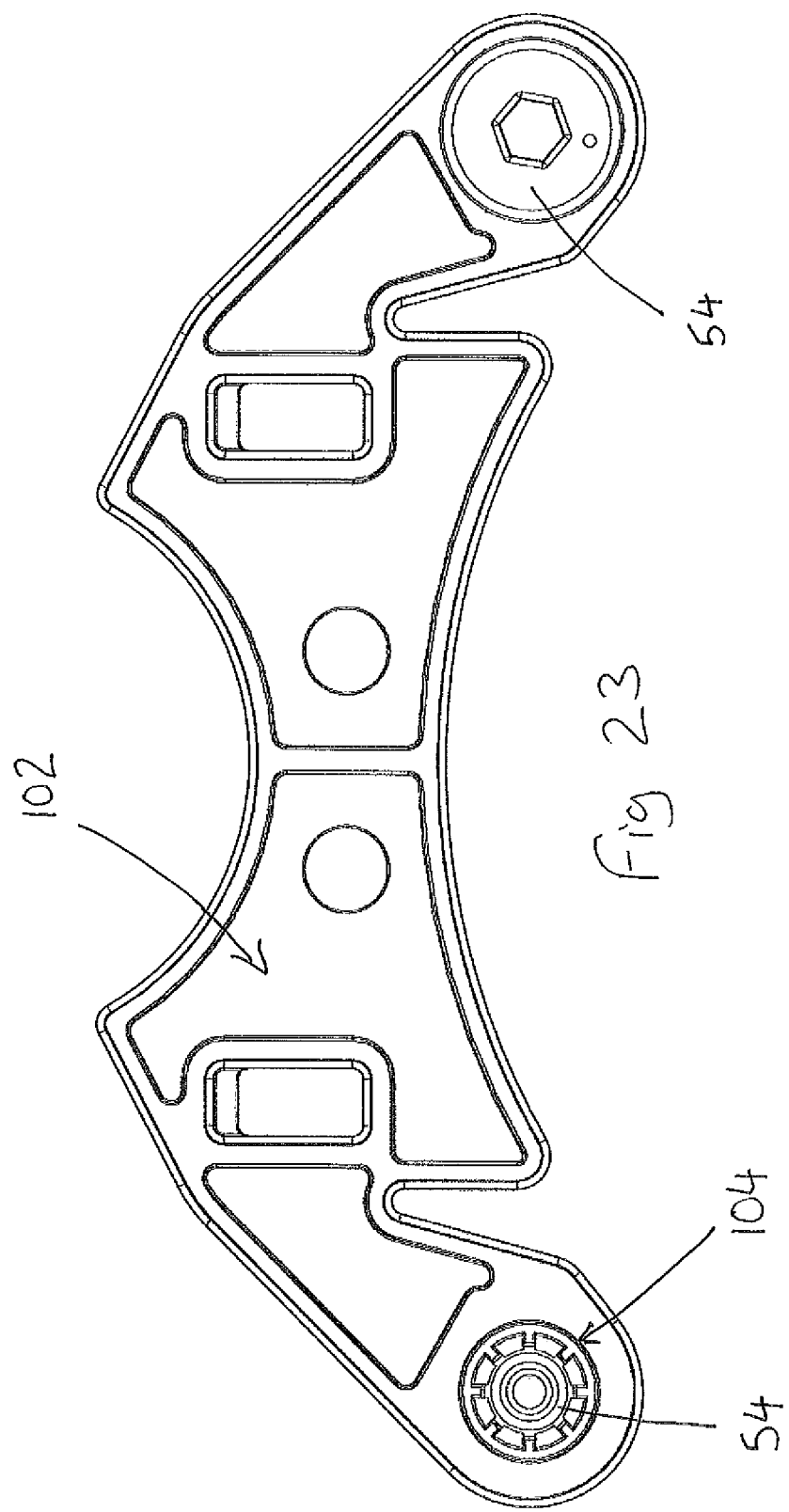
FIG. 23 is a diagrammatic side view of a second base member according to the invention.
Figure 24:
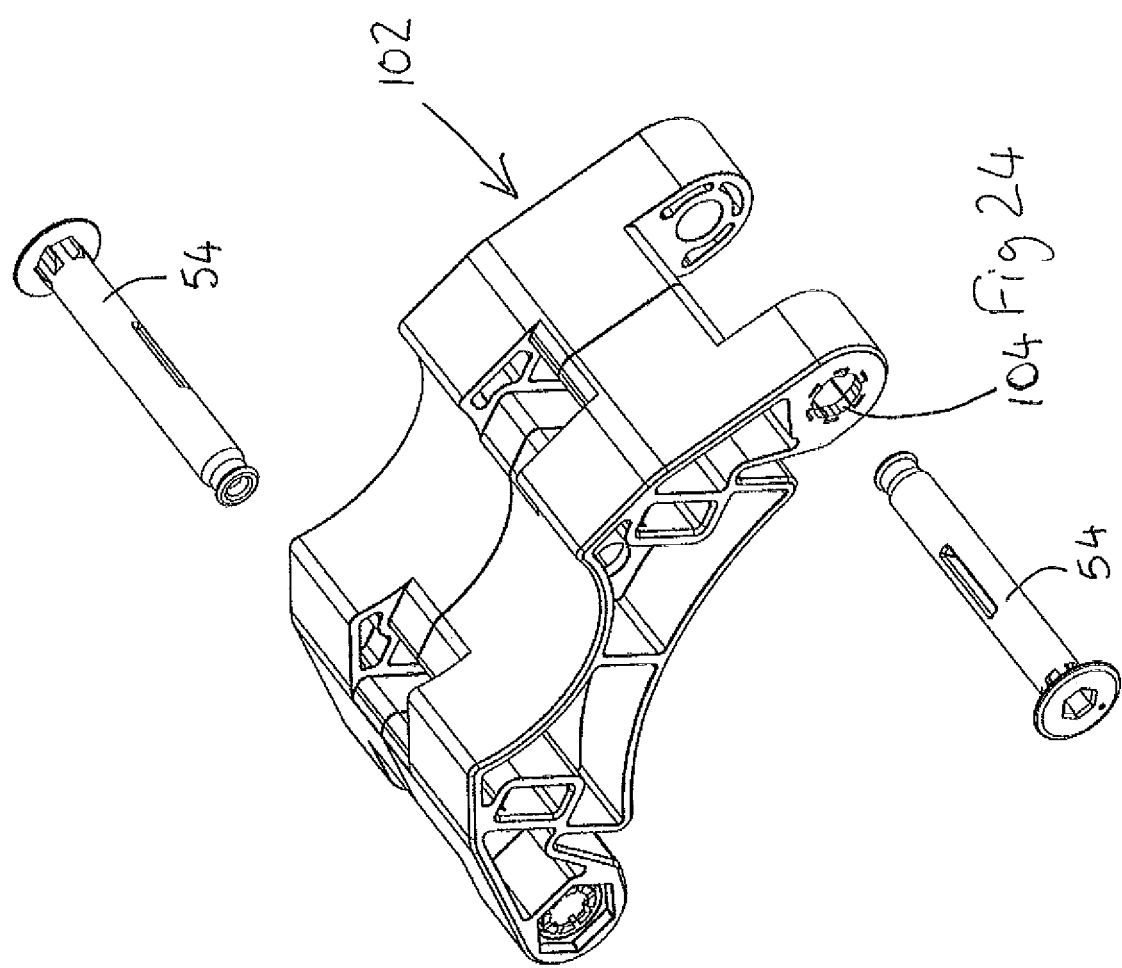
FIG. 24 is a diagrammatic perspective view of the second base member of FIG. 23 with two pins.
Figure 25:
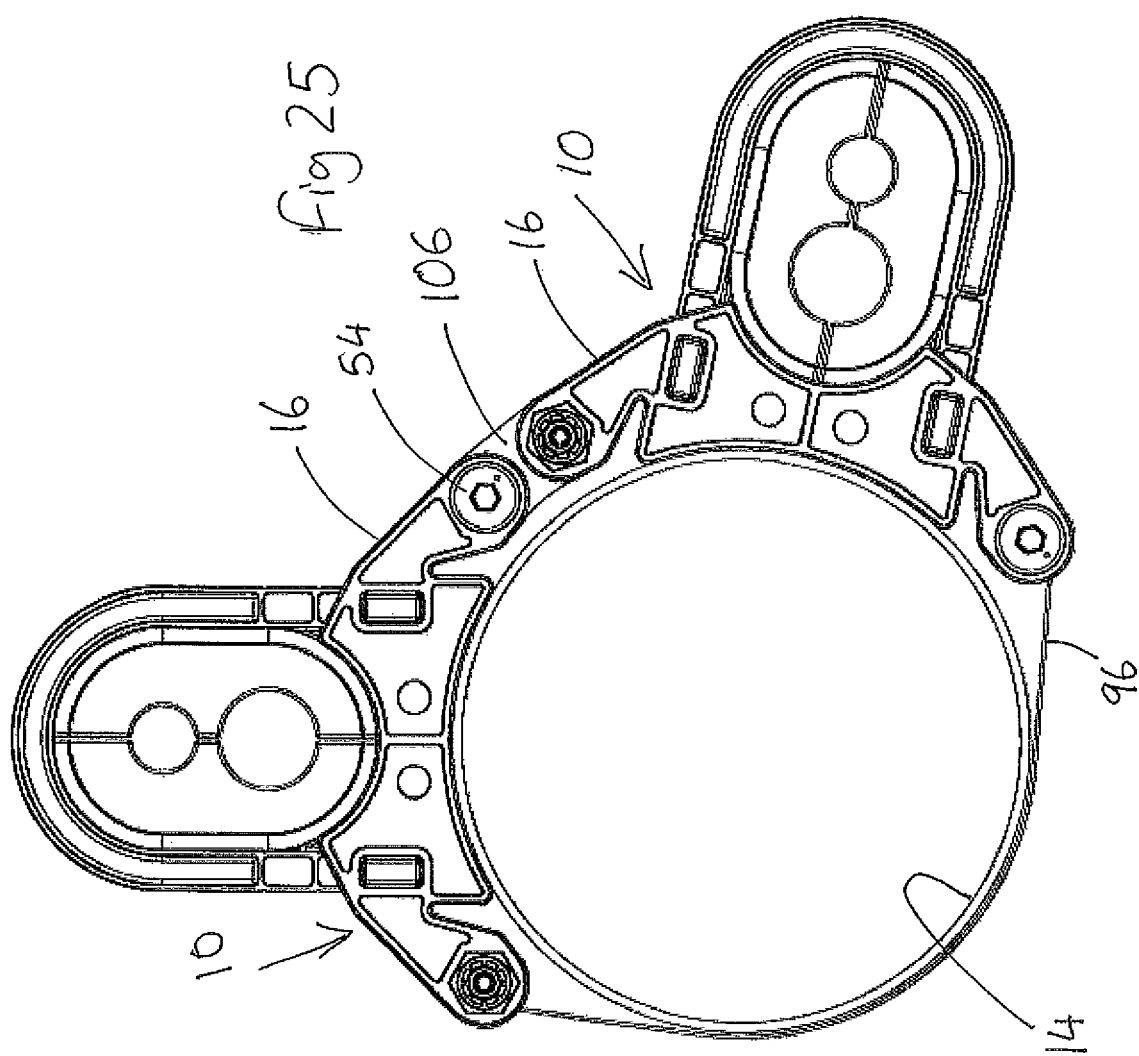
FIGS. 25 to 27 are respectively diagrammatic end, perspective and sectional views of a further mounting arrangement according to the invention.
Figure 26:
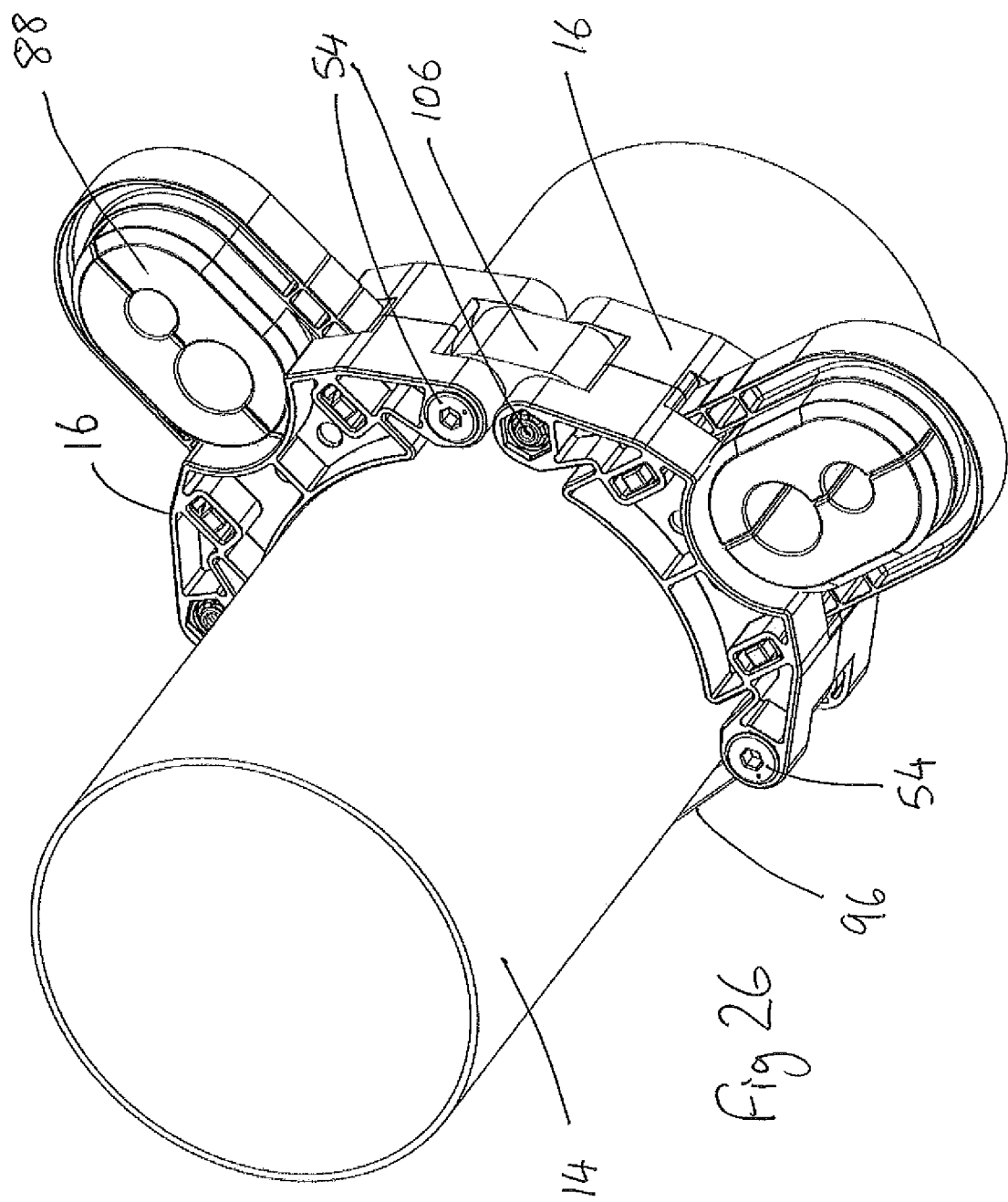
Figure 27:
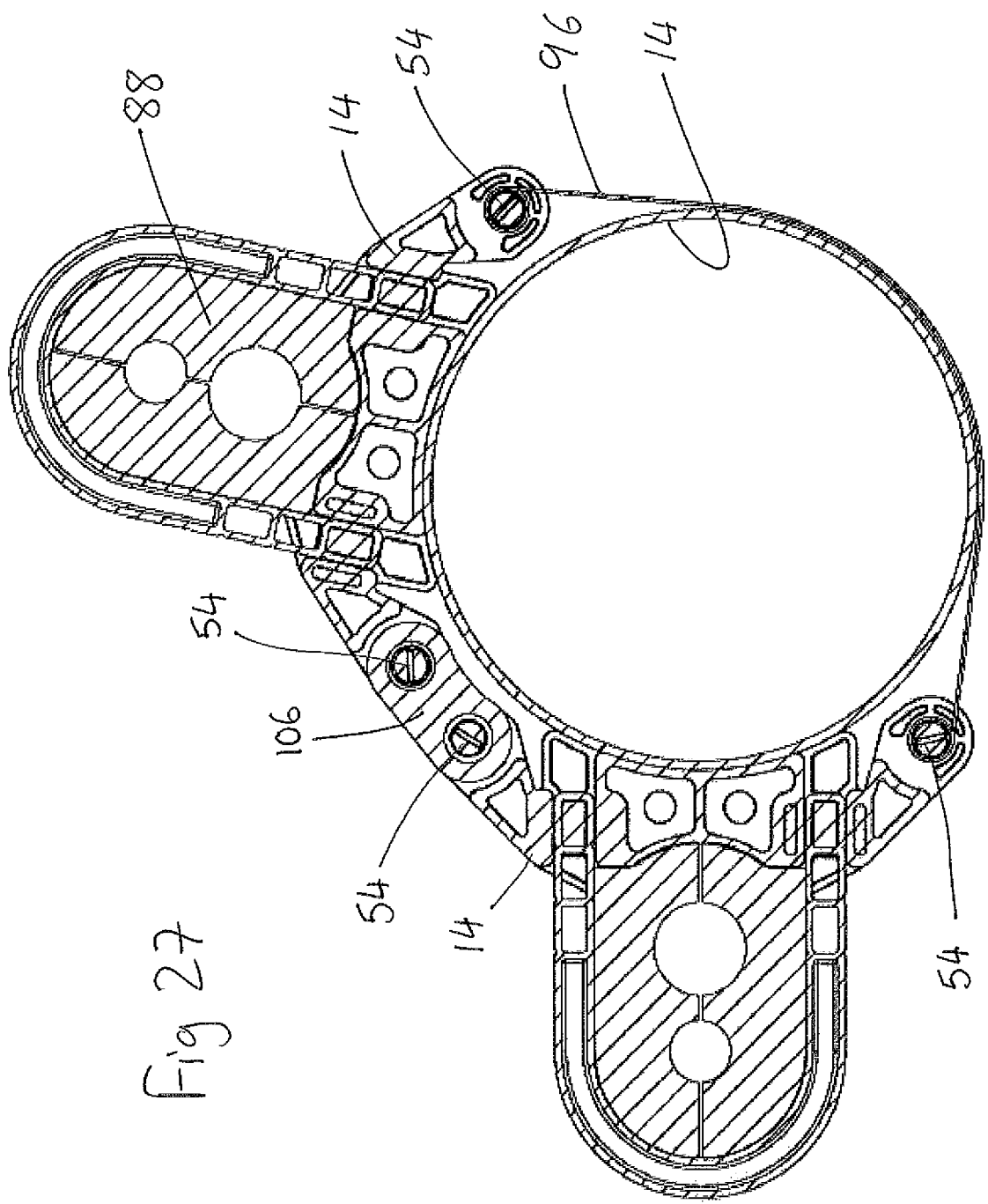

FIGS. 20 to 22 show a second configuration where the insert member 88 is held in place between the guide member 82 and base member 16, and two smaller and even smaller pipes 98, 100 are mounted parallel to the larger pipe 14.

FIGS. 23 and 24 and 31 to 35 show a second base member 102 which is similar to the first base member 16 except that the ratchet formation 104 is integrally formed with the remainder of the second base member 102. The ratchet formation 104 again comprises a plurality of circumferentially outwardly extending L-shape recesses 48 defining a section 50 of material providing a cam surface 52, which section 50 of material can be flexed outwardly.

Figure 28:
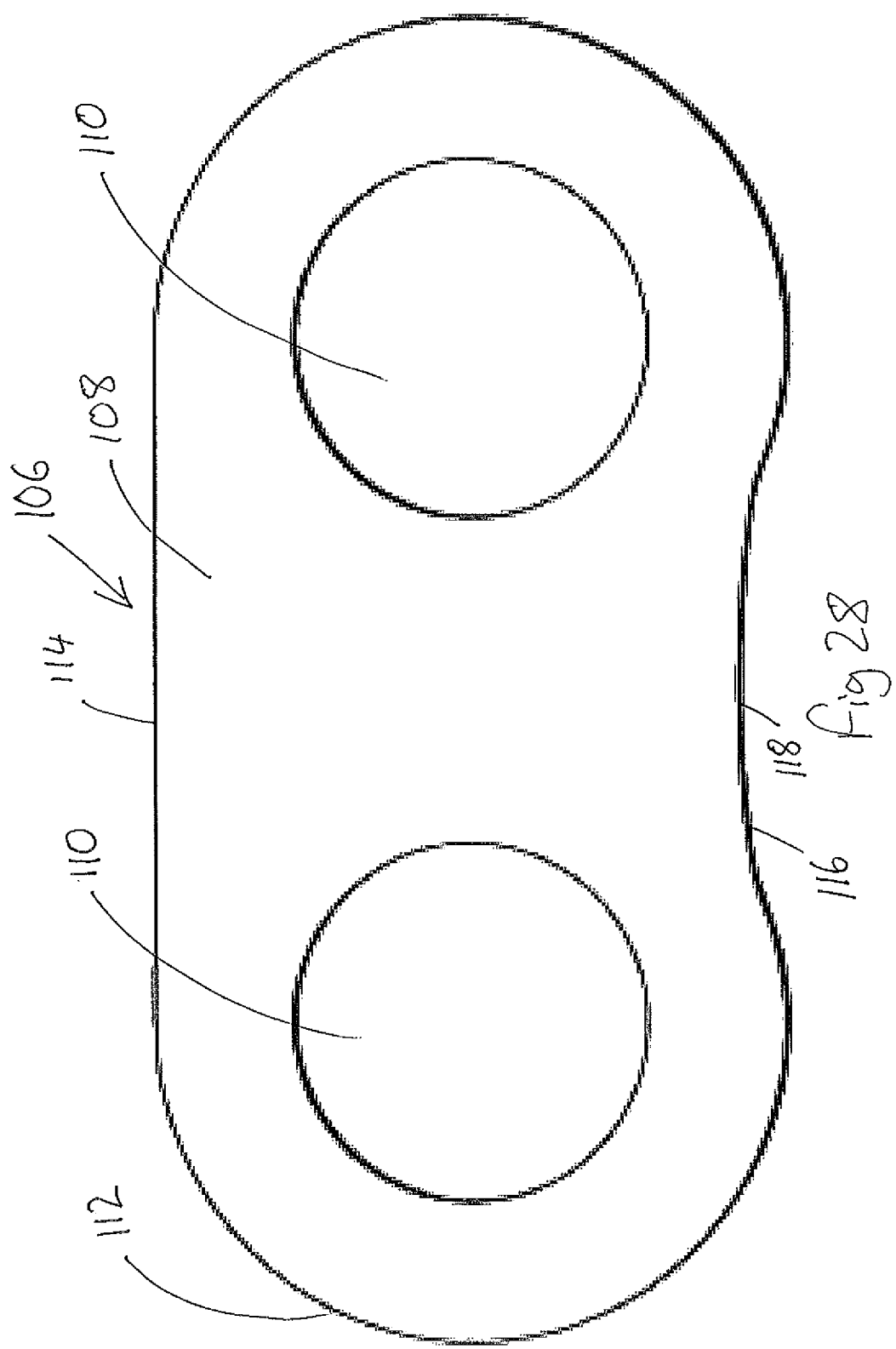
FIGS. 28, 29 and 30 are respectively diagrammatic side, and first and second perspective views, of a component of the further mounting arrangement of FIG. 25.
Figure 29:
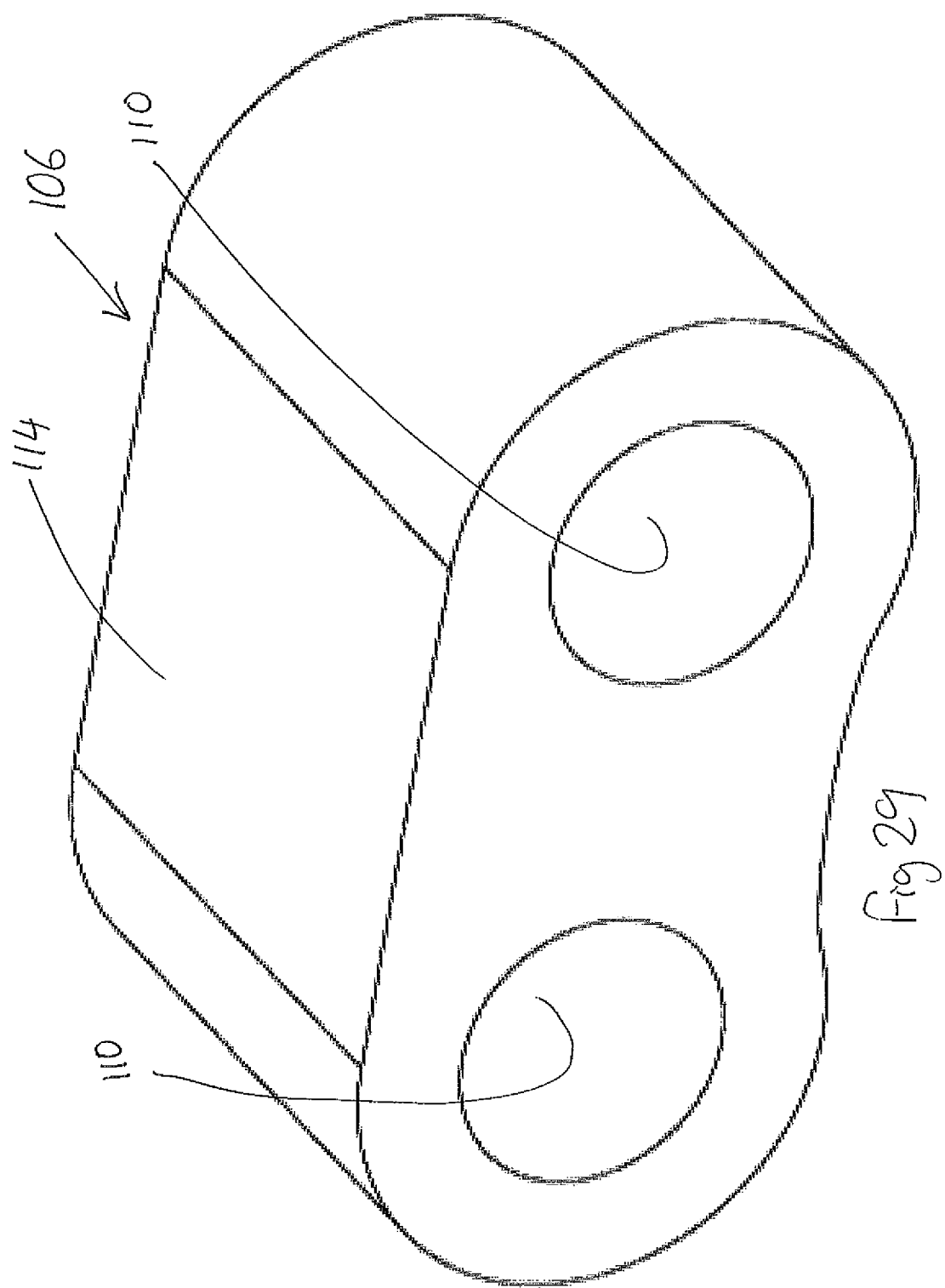
Figure 30:
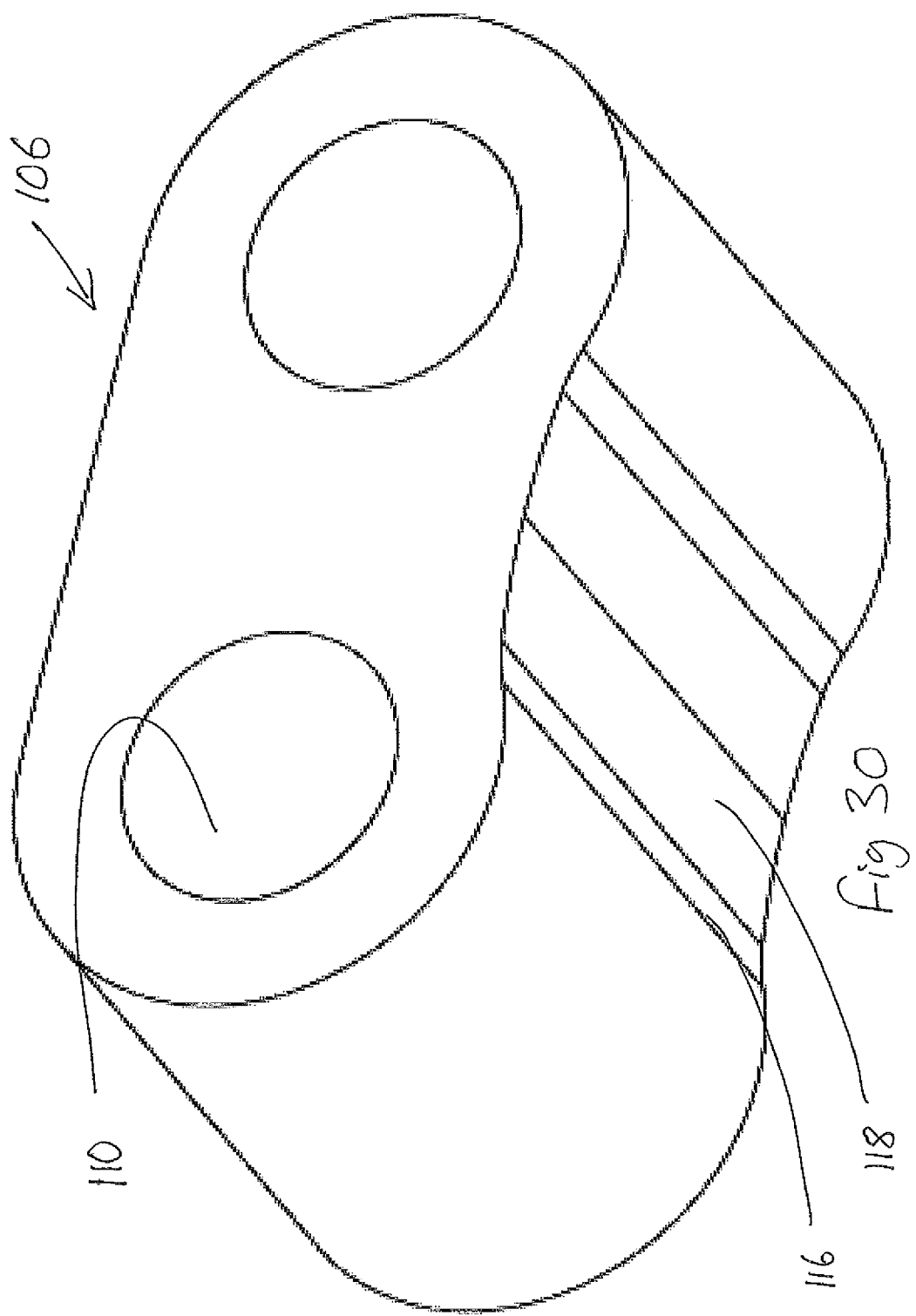
Figure 31:
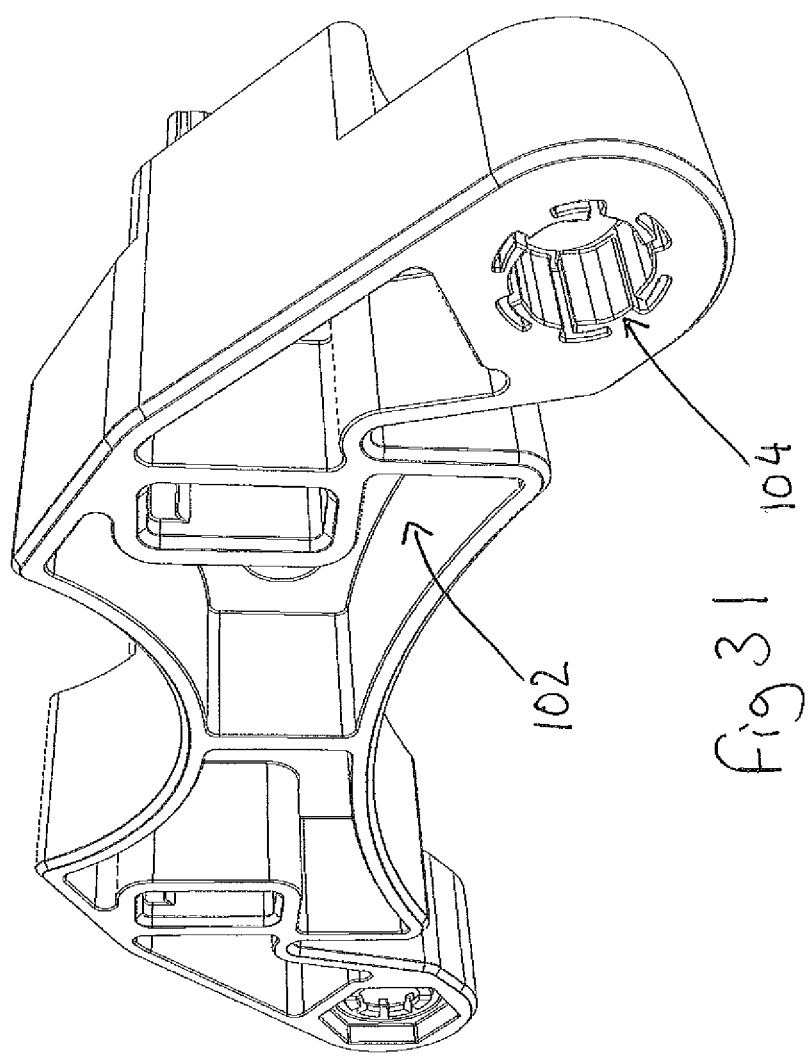
FIG. 31 is a diagrammatic perspective view of the second base member of FIG. 23.
Figure 32:
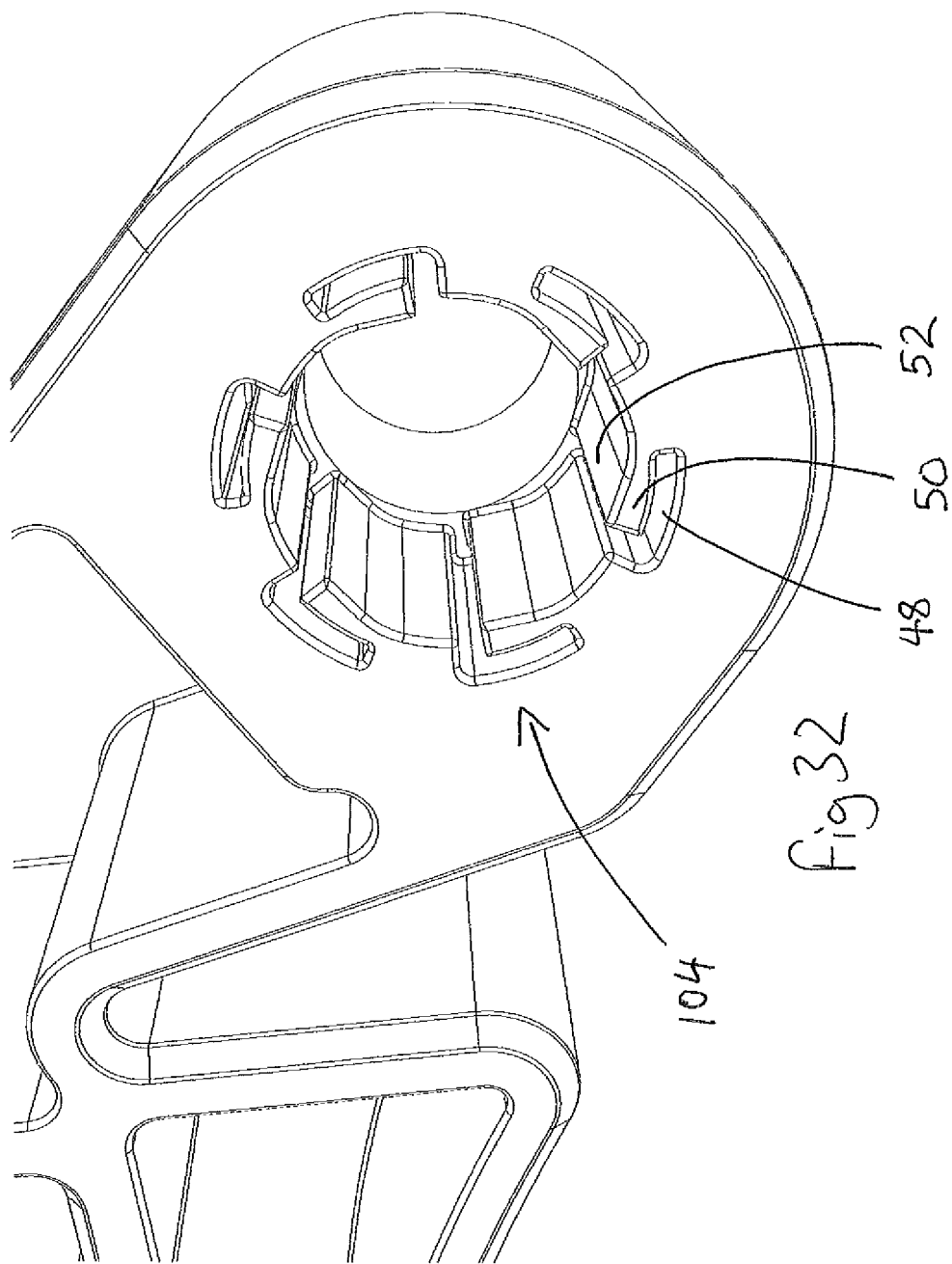
FIG. 32 is a diagrammatic perspective view of a part of the second base member of FIG. 23.
Figure 33:
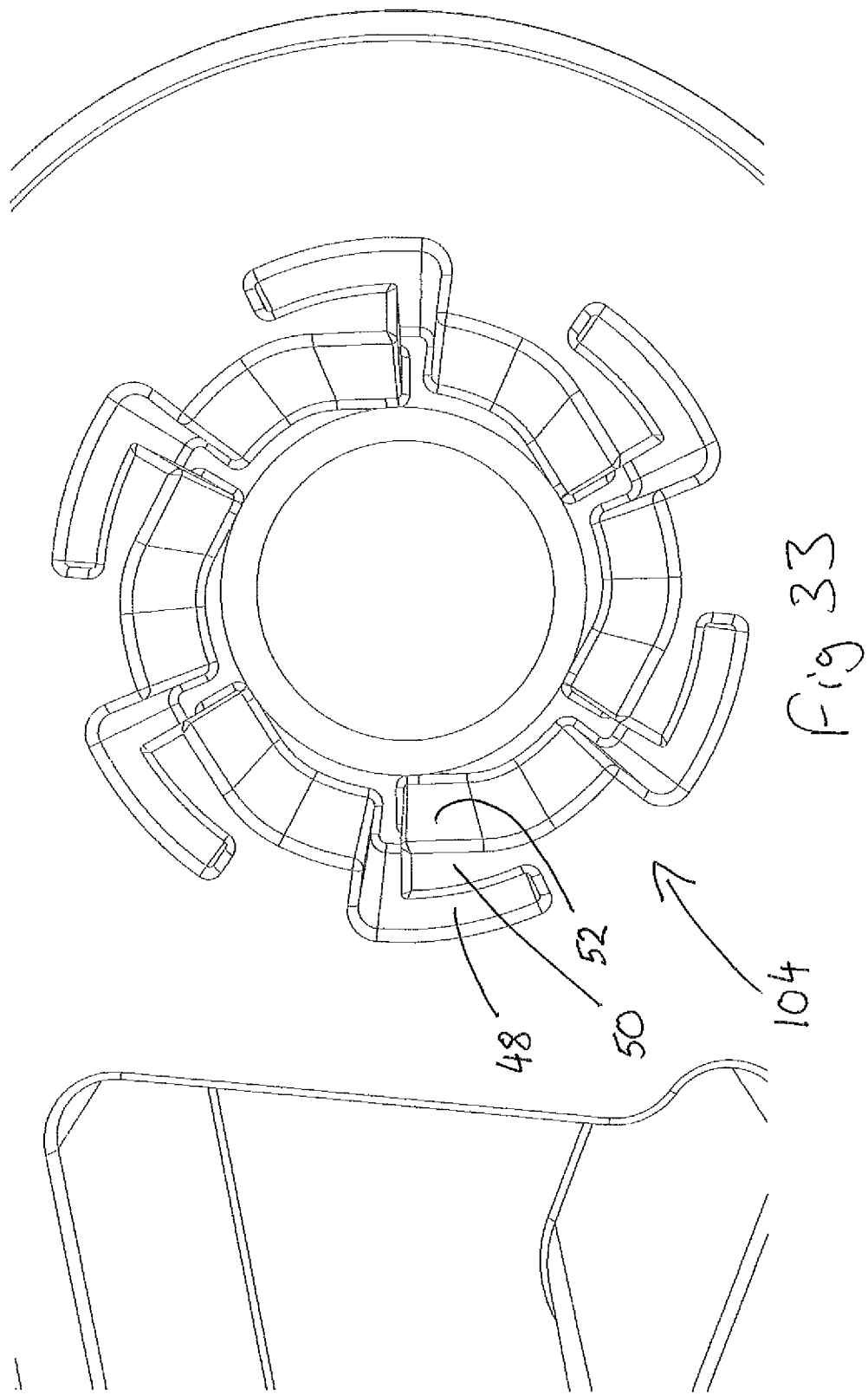
FIG. 33 is a diagrammatic side view of part of the second base member of FIG. 23.
Figure 34:
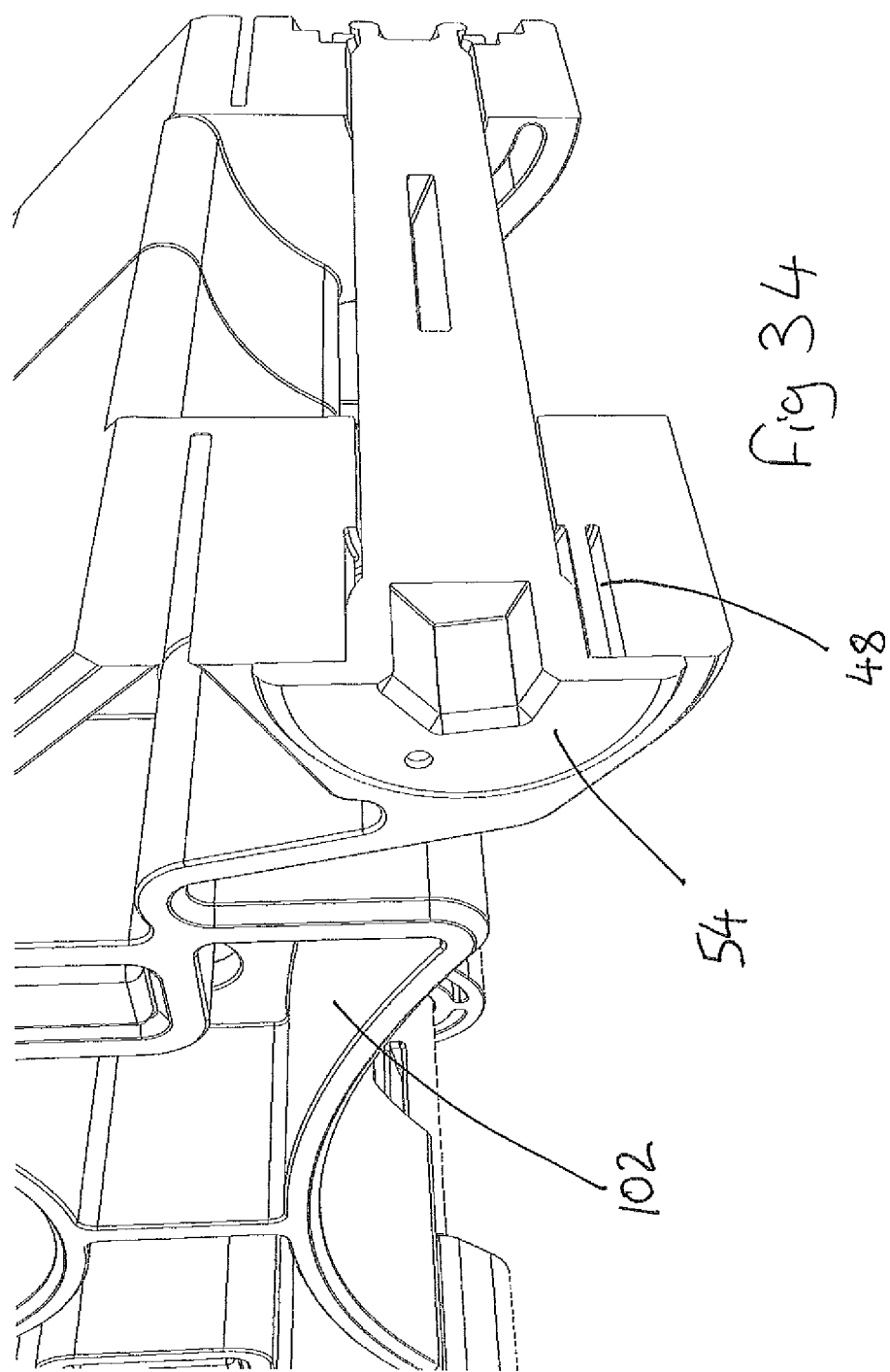
FIG. 34 is a diagrammatic cut away perspective view of part of the second base member of FIG. 23 including a pin.
Figure 35:
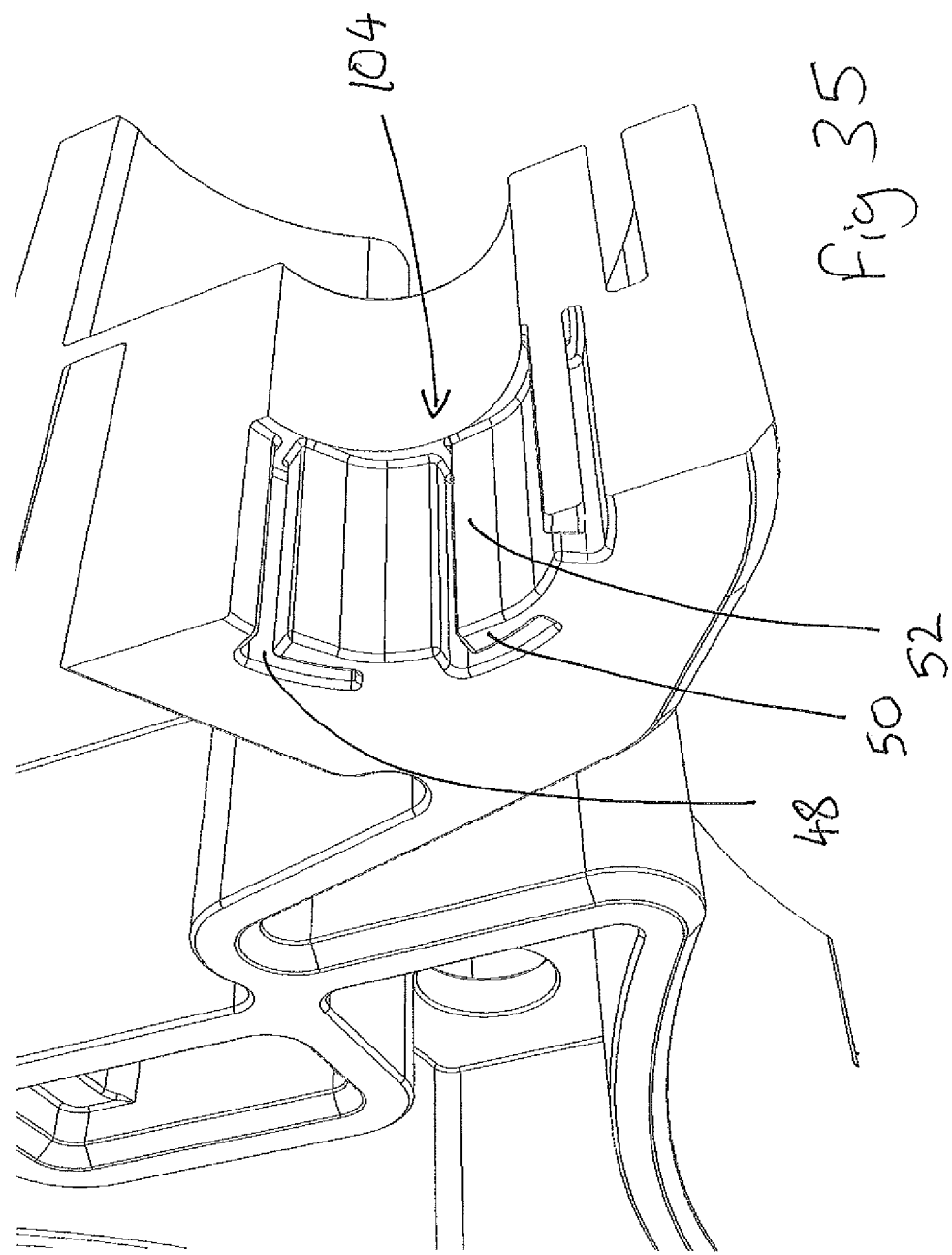
FIG. 35 is a diagrammatic perspective cut away view of part of the second base member of FIG. 23.

FIGS. 25 to 30 show a further mounting arrangement. This arrangement includes two mounting arrangements 10 for instance as shown in FIGS. 20 to 22, which arrangements 10 are interconnected and circumferentially aligned around an existing elongate member such as a large pipe 14. A link member 106, as particularly shown in FIGS. 28 to 30, is provided interconnecting the two mounting arrangements 10.

The link member 106 is made of a profiled body 108 of plastics material, which may be solid or hollow as required. The link member 106 has two spaced parallel through passages 110. The body 108 has rounded ends 112 co-axial with the through passages 110. An outer face 114 of the body 108 is straight, whilst an inner face 116 has a profiled indent 118 to permit location adjacent to the pipe 114.

The link member 106 interconnects two adjacent arrangements 10 by respective pins 54 on the adjacent arrangements 10 extending through a respective one of the through passages 110 on the link member 106. The pins 54 at the opposite ends of the arrangements 10 mount an end of a band 96 which extends around the pipe 14 to mount a further arrangement thereon in a similar manner as shown for instance in FIGS. 17 to 22.

It is to be realised that more than two arrangements 10 could be mounted together by respective link members 106 in a similar manner. Such an arrangement enables a multiple configuration of additional elongate members to be mounted on an existing elongate member, and appropriate insert members 88 can be provided as required.

FIGS. 36 to 41 show a further mounting arrangement 120 which is similar in many respects to the mounting arrangement 10. Again the mounting arrangement 120 includes a base member 122 formed from two identical parts 124 mounted together by projections 126. Again a generally n shape guide member 128 is provided.

Figure 36:
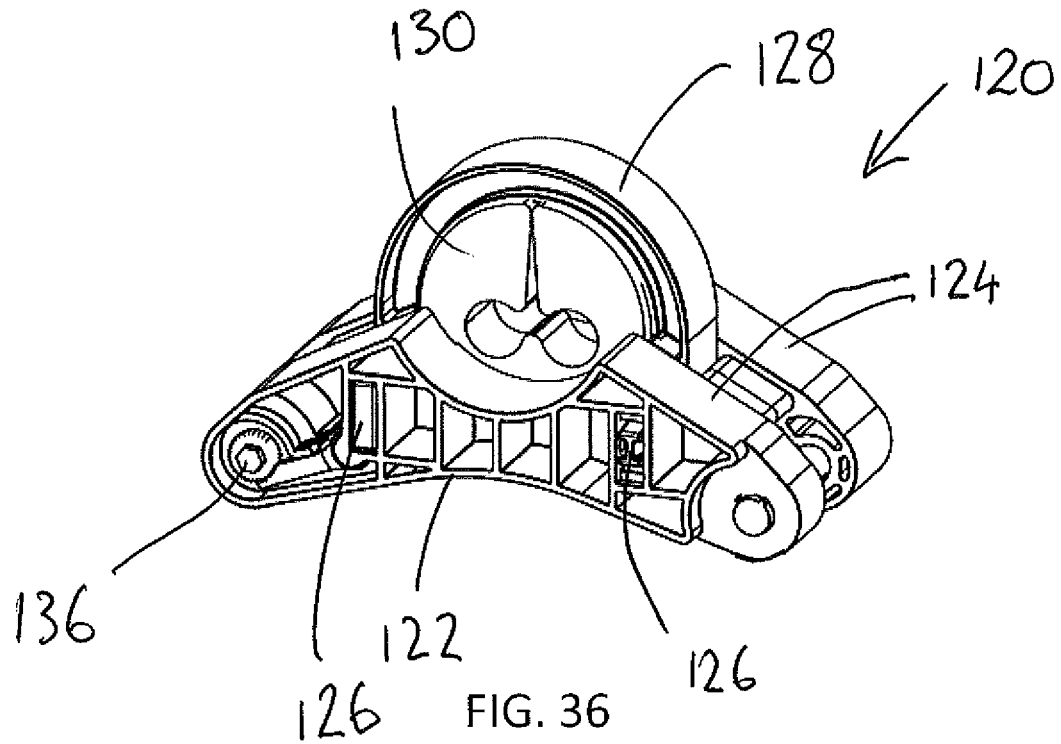
FIG. 36 is a diagrammatic perspective view of a further mounting arrangement in a first configuration.
Figure 37:
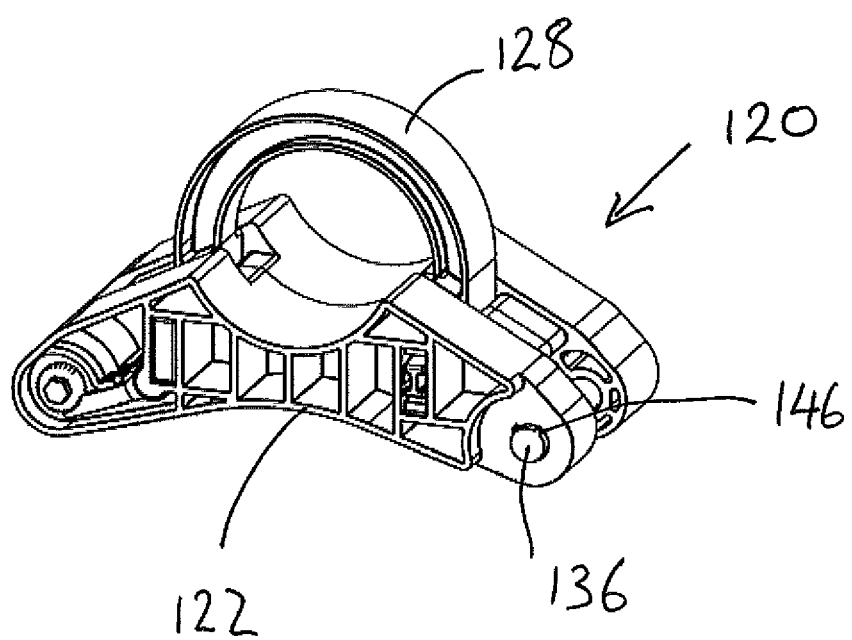
FIG. 37 is a similar view to FIG. 36 but in a second configuration.

An insert member 130 is provided for use if required as shown in FIG. 36, but is not required in FIG. 37. In this instance the insert member 130 is formed from a single profiled piece of resilient material with two through openings 132 interconnected together with a split 134 extending to an edge of the insert member 130. This means that the insert member 130 can be fitted onto for instance two pipes extending through the respective openings 132 when clear of the guide member 128, but the insert member 130 is profiled such that when located within the guide member 128, the split 134 is closed as shown in FIG. 36, thereby retaining the pipes extending through the openings 132.

The mounting arrangement 120 has a somewhat different ratchet arrangement. The pins 136 are again provided with through longitudinal slots 138. Each pin 136 has a head 140 at one end, with a plurality of serrations 142 around the head 140. A hexagonal cross section projection 144 extends outwardly from the head 140 to permit rotation thereof by a tool. A radial projection 146 is provided on the opposite end of the pin 136 to the head 140 which is alignable with a recess 148 in the base member 122 to locate the pin 136 in position, but otherwise when not aligned with the recess 148 the projection 146 will retain the pin 136 in place.

Figure 38:
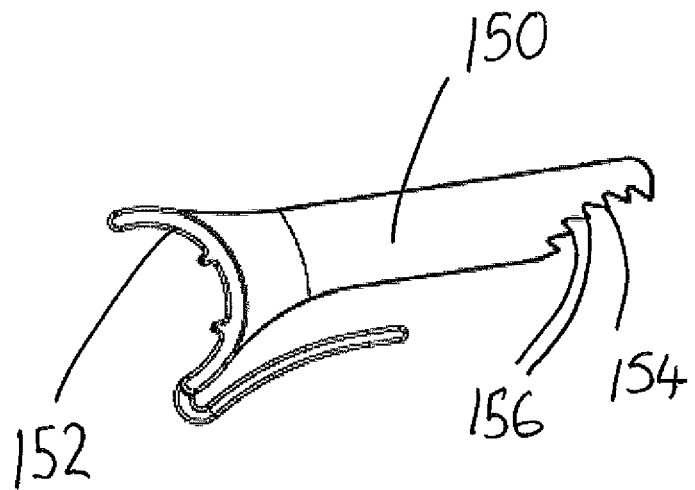
FIG. 38 is a diagrammatic side view of a component of the mounting arrangement of FIG. 36.
Figure 39:
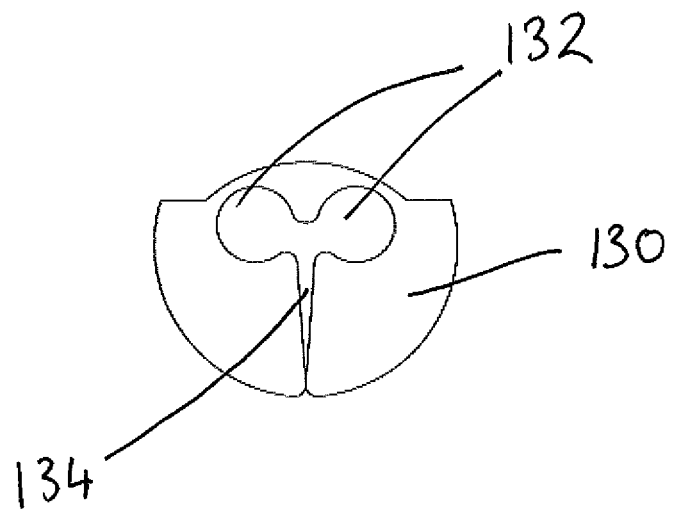
FIGS. 39 and 40 are respectively side and perspective views of a further component of the arrangement of FIG. 36, usable in the first configuration.
Figure 40:
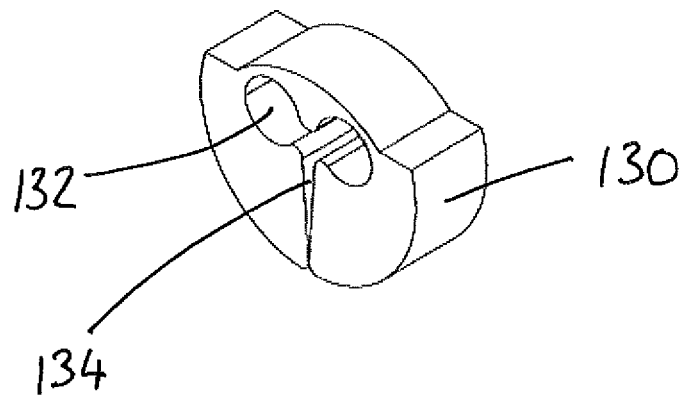
Figure 41:
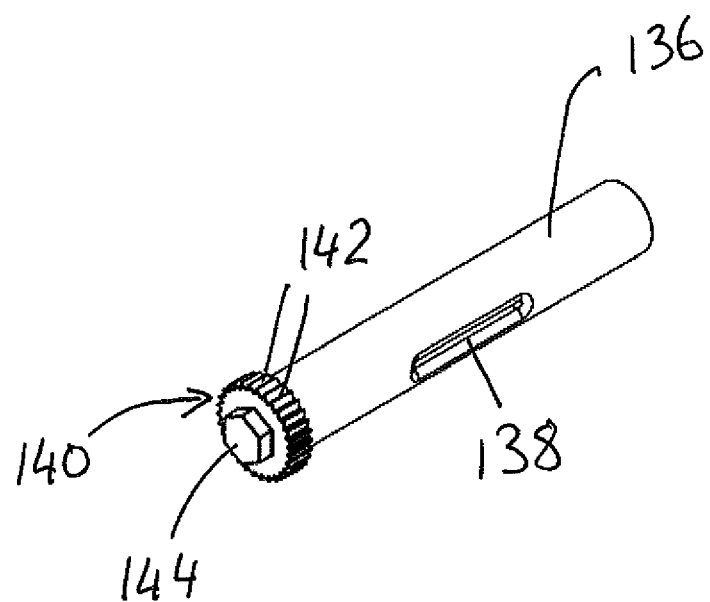
FIG. 41 is a diagrammatic perspective view of a yet further component of the arrangement of FIG. 36.

A resilient ratchet member 150 is mounted on each part 124 of the base member 122 on diagonally opposite locations thereof by a mounting formation 152 on the member 150. The ratchet member 150 is in the form of a sprung finger and has a profiled engagement surface 154 on a distal end thereof, which profiled surface 154 comprises a plurality of inclined teeth 156 which are engageable with the serrations 142 on a respective pin 146. The inclination of the teeth 156 on the engagement surface 152 is such as to permit the pin 146 to be rotatable in one direction, clockwise as shown in FIG. 38 with the teeth 156 riding over the serrations 142, but to prevent rotation in an opposite direction, i.e. anti-clockwise as shown in FIG. 38 such that when rotation is attempted in this direction the serrations 142 will engage with the inclined teeth 156.

Figure 42:
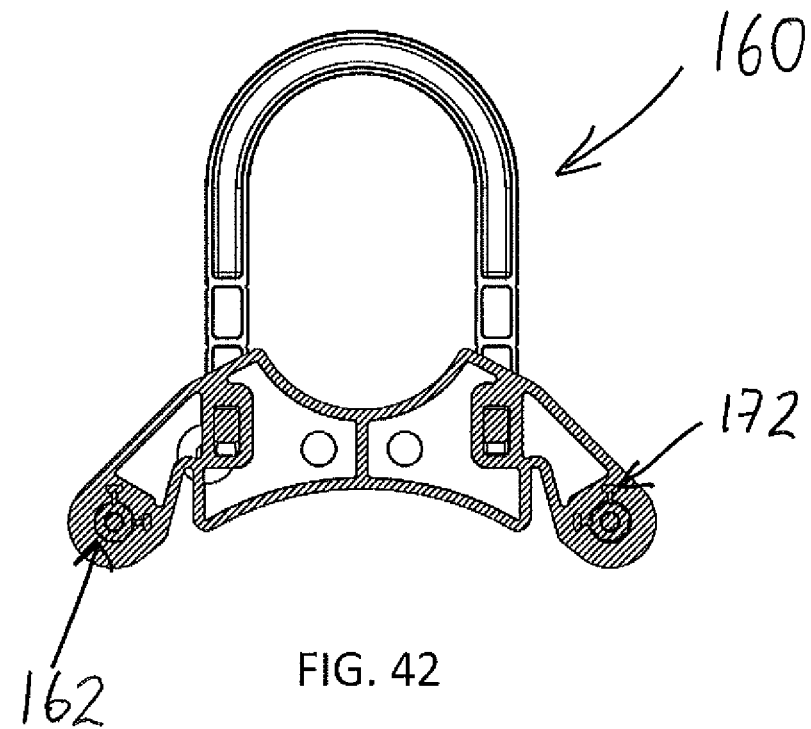
FIG. 42 is a diagrammatic cross sectional view through a still further mounting arrangement according to the invention.
Figure 43:
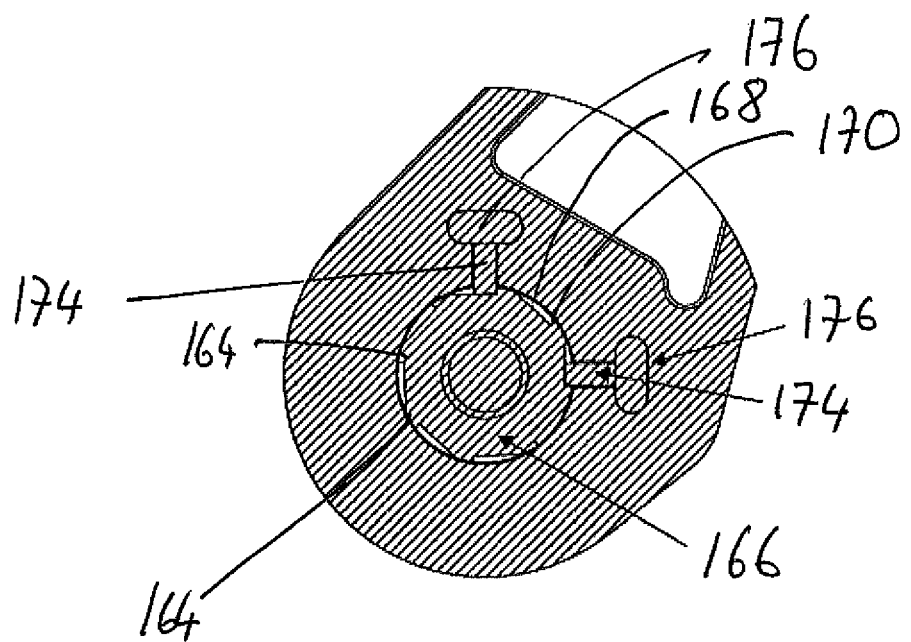
FIG. 43 is an enlarged part of FIG. 42.

FIGS. 42 and 43 show a still further mounting arrangement 160 with a different ratchet arrangement 162. In the arrangement 162 a set of profiled teeth 164 are provided on a head 166 of a pin, which teeth 164 have a cam surface 168 leading to an inward step 170, such that the head 166 can be rotated in a direction, clockwise as shown in FIG. 43, in which an engagement member 172 rides across the cam surface 168 and then falls down the step 170. Rotation in the opposite direction is though prevented by an engagement member 172 engaging against the step 170.

In this instance engagement members 172 are provided in the form of pins 174 which may be made for instance of stainless steel. An opposite end of the pin 174 to that which engages against the profiled teeth 164 engages against a trapped resilient member which in this instance is a block 176 of silicon rubber located in a recess in the base member. Two such pins 174 and blocks 176 are provided, circumferentially spaced from each other.

There are thus described mounting arrangements which provide for a number of advantages. The arrangement is modular thereby reducing the number of components. With the arrangement on the underside of the base member with the three portions, this means that such base members can be used on a range of different sizes of existing elongate members, and tightening of a band will cause the outer portions to flex inwardly by virtue of the recesses, relative to the size of the existing elongate member.

The base member described in FIGS. 36 to 43 is substantially not flexible, and base members with different curvatures will be provided for use on different sized pipes.

The base members can readily be mounted on an existing elongate member when required. If for instance it is required to subsequently mount further additional pipes or other elongate members on an existing elongate member, additional base members could be mounted, and these could be mounted offset relative to existing base members and guide members.

Different insert members when used can be mounted as required, and a wide range of different insert members could be provided for the same guide and base members. Also providing the insert members in two parts makes for ease of installation. The ratcheting arrangement provides for ease of use whilst providing secure mounting.

It is to be realised that a wide range of other modifications may be made without departing from the scope of the invention. For instance the base members and/or guide members may take a different form, and/or could be made of different materials. As indicated a wide range of insert members could be used as required. Different ratching arrangements could be provided.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mounting arrangement including a base member which is mountable on the outside of an existing elongate member and a guide member for supporting an additional elongate member extending parallel to the existing elongate member, the guide member being mountable on the base member to extend radially therefrom, wherein the guide member is substantially n-shaped having limbs that are mountable to the base member, a plurality of through holes being provided on each limb to permit the guide member to be mounted at a plurality of different positions, wherein a pair of spaced aligned mounting holes are provided on the base member, which are alignable respectively with a one of a plurality of through holes in the guide member, with an elongate mounting member extendable therethrough, to mount the guide member on the base member.

2. A mounting arrangement according to claim 1, in which the base member includes one or more securing formations to secure a line means to the base member, which line means can extend around an existing elongate member.

3. A mounting arrangement according to claim 1, in which the base member is made of two identical parts.

4. A mounting arrangement according to claim 1, in which a resilient member or members an underside of the base member is provided with any of a resilient member or members or surface formations to engage against the surface of an existing elongate member.

5. A mounting arrangement according to claim 1, in which the base member includes a central portion with a substantially arcuate underside, and outer portions which are of greater diameter than the central portion, with recesses on the underside of the base member between the central portion and respective outer portions such that the base member can flex about the recesses.

6. A mounting arrangement according to claim 1, in which a number of openings are provided in the base member.

7. A mounting arrangement according to claim 1, in which the arrangement includes line means extendable around an existing elongate member.

8. A mounting arrangement according to claim 1, in which a link member is provided for mounting together two base members in a circumferential alignment on an existing elongate member.

9. A mounting arrangement according to claim 8, in which securing formations are provided towards each circumferential end of the base member, which securing formations each include a securing member extending transversely across the base member, and the link member is engageable with respective securing members on adjacent base members.

10. A mounting arrangement according to claim 8, in which the link member includes a profiled face engageable against an existing elongate member, when mounting together two base members on an existing elongate member.

11. A mounting arrangement according to claim 8, in which the mounting arrangement includes a plurality of base members with respective guide members, and a respective link member or members for mounting together the base members.

12. A mounting arrangement including a base member which is mountable on the outside of an existing elongate member and a guide member for supporting an additional elongate member extending parallel to the existing elongate member, the guide member being mountable on the base member to extend radially therefrom, in which securing formations are provided towards each circumferential end of the base member, in which the securing formations each include a ratcheting configuration which is profiled to permit a correspondingly profiled securing member to be rotatingly movable relative to the base member in one direction, but to be restrained from rotation in an opposite direction by the interaction of the profiling of the ratcheting formation and the securing member.

13. A mounting arrangement including a base member which is mountable on the outside of an existing elongate member and a guide member for supporting an additional elongate member extending parallel to the existing elongate member, the guide member being mountable on the base member to extend radially therefrom, in which the guide member includes an enclosure member which is mountable to the base member to enclose an area through which an additional elongate member or members may supportingly extend, in which the guide member also includes an insert member locatable within the area enclosed by the enclosure member, with one or more openings provided through the insert member to permit an additional elongate member to supportingly extend therethrough.

14. A mounting arrangement according to claim 13, in which the insert member is made of two parts.

15. A mounting arrangement according to claim 14, in which the, some, or all of the openings in the insert member are defined by both parts of the insert member.

16. A mounting arrangement according to claim 13, in which the insert member is made of a resilient material, and has a gap extending to an edge thereof, such that opposite sides of the gap can be pushed together to locate the insert member in the guide member, and release of the gap will cause the insert member to relax and be held resiliently in the guide member.

* * * * *